(12) United States Patent
Yong et al.

(10) Patent No.: US 12,253,377 B2
(45) Date of Patent: Mar. 18, 2025

(54) INFORMATION PROCESSING DEVICE, INFORMATION PROCESSING METHOD, AND STORAGE MEDIUM

(71) Applicant: TOYOTA JIDOSHA KABUSHIKI KAISHA, Toyota (JP)

(72) Inventors: Jiawei Yong, Kawasaki (JP); Shintaro Fukushima, Bunkyo-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 223 days.

(21) Appl. No.: 18/050,738

(22) Filed: Oct. 28, 2022

(65) Prior Publication Data

US 2023/0251103 A1 Aug. 10, 2023

(30) Foreign Application Priority Data

Jan. 18, 2022 (JP) ................. 2022-005849

(51) Int. Cl.
*G01C 21/36* (2006.01)
*G06N 20/00* (2019.01)

(52) U.S. Cl.
CPC ......... *G01C 21/3617* (2013.01); *G06N 20/00* (2019.01)

(58) Field of Classification Search
CPC .............. G01C 21/3617; G06N 20/00
See application file for complete search history.

(56) References Cited

U.S. PATENT DOCUMENTS

2013/0197890 A1* 8/2013 Ide ................. G01C 21/3484
   703/6
2022/0065646 A1* 3/2022 Nishimura ........ G01C 21/3617

FOREIGN PATENT DOCUMENTS

JP 2019-185232 A 10/2019

OTHER PUBLICATIONS

Qiang LIU, et al., "Predicting the Next Location: A Recurrent Model with Spatial and Temporal Contexts", Proceedings of the Thirtieth AAAI Conference on Artificial Intelligence (AAAI-16), (USA), vol. 30, No. 1, Feb. 2016, pp. 194-200.

* cited by examiner

*Primary Examiner* — Seth A Silverman
(74) *Attorney, Agent, or Firm* — Oblon, McClelland, Maier & Neustadt, L.L.P.

(57) ABSTRACT

An information processing device includes a control unit that performs prediction, from a first movement route including a predetermined number of continuous road links, of one or more road links that are traveled by a first mobile object subsequent to the first movement route, based on movement history information on one or more mobile objects traveling on a road. The control unit performs the prediction by using a machine learning model that, for an input of sequential data, outputs one piece of data or sequential data subsequent to the input sequential data.

4 Claims, 17 Drawing Sheets

FIG. 4

EXAMPLE OF SEQUENCE OF ROAD LINKS IN TRIP

| TRIP #1 TIMESTAMP | LINK #1 → LINK #2 → LINK #3 → LINK #4 → LINK #6<br>12:03:23    12:03:26    12:03:32    12:03:34    12:03:38 |
|---|---|
| TRIP #2 TIMESTAMP | LINK #1 → LINK #2 → LINK #3 → LINK #4 → LINK #7<br>14:21:55    14:21:59    14:22:02    14:22:10    14:22:13 |
| TRIP #2 TIMESTAMP | LINK #1 → LINK #2 → LINK #3 → LINK #4 → LINK #6<br>18:23:21    18:23:25    18:23:30    18:23:33    18:23:45 |

⋮

| TRIP #n TIMESTAMP | |
|---|---|

FIG. 5

PASSAGE TIME LENGTH DB

| LINK ID | AVERAGE TIME LENGTH FOR PASSAGE (SECONDS) |
|---|---|
| 1 | 3.67 |
| 2 | 4.67 |
| 3 | 4.33 |

FIG. 6

BRANCH INFORMATION DB

| BRANCH POINT | NEXT LINK (NUMBER OF TRANSITIONS) |
|---|---|
| LINK #4 | FIRST RANKING: LINK #5(6) <br> SECOND RANKING: LINK #6(5) <br> THIRD RANKING: LINK #7(4) |
| LINK #5 | FIRST RANKING: LINK #6(5) <br> SECOND RANKING: LINK #10(3) |
| LINK #8 | FIRST RANKING: LINK #9(3) <br> SECOND RANKING: LINK #10(2) |

FIG. 8

BRANCH INFORMATION DB

| BRANCH POINT | NEXT LINK (NUMBER OF TRANSITIONS) |
|---|---|
| LINK #4 | FIRST RANKING: LINK #5(6)<br>SECOND RANKING: LINK #6(5) |
| LINK #5 | FIRST RANKING: LINK #6(5)<br>SECOND RANKING: LINK #10(3)<br>THIRD RANKING: LINK #4(2) |
| LINK #6 | FIRST RANKING: LINK #9(3)<br>SECOND RANKING: LINK #10(2) |

PRIMARY PREDICTED ROUTE
4 → #5 → #6
(BRANCH POINT) (BRANCH POINT) (BRANCH POINT)

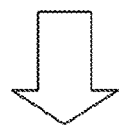

SECONDARY PREDICTED ROUTE

FIRST ROUTE  #4 → #6 → #9   $t(4) + t(6) < T - a \leq t(4) + t(6) + t(9)$

SECOND ROUTE  #4 → #5 → #10 → #11   $t(4) + t(5) + t(10) < T - a$
$\leq t(4) + t(5) + t(10) + t(11)$

RANKING DETERMINATION PROCESSING

FIRST RANKING: PRIMARY PREDICTED ROUTE

SECOND RANKING: SECONDARY PREDICTED ROUTE WITH HIGHEST SCORE

THIRD RANKING: SECONDARY PREDICTED ROUTE WITH SECOND HIGHEST SCORE

⋮

CALCULATION OF SCORE

SCORE

FIRST SECONDARY PREDICTED ROUTE 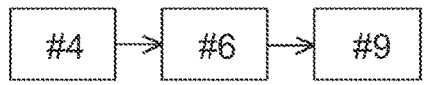

PROBABILITY OF TRANSITION     0.3     0.5          MEAN VALUE 0.4

SECOND SECONDARY PREDICTED ROUTE 

PROBABILITY OF TRANSITION     0.25    0.45    0.75    MEAN VALUE 0.48

FIG. 17
TIME T1
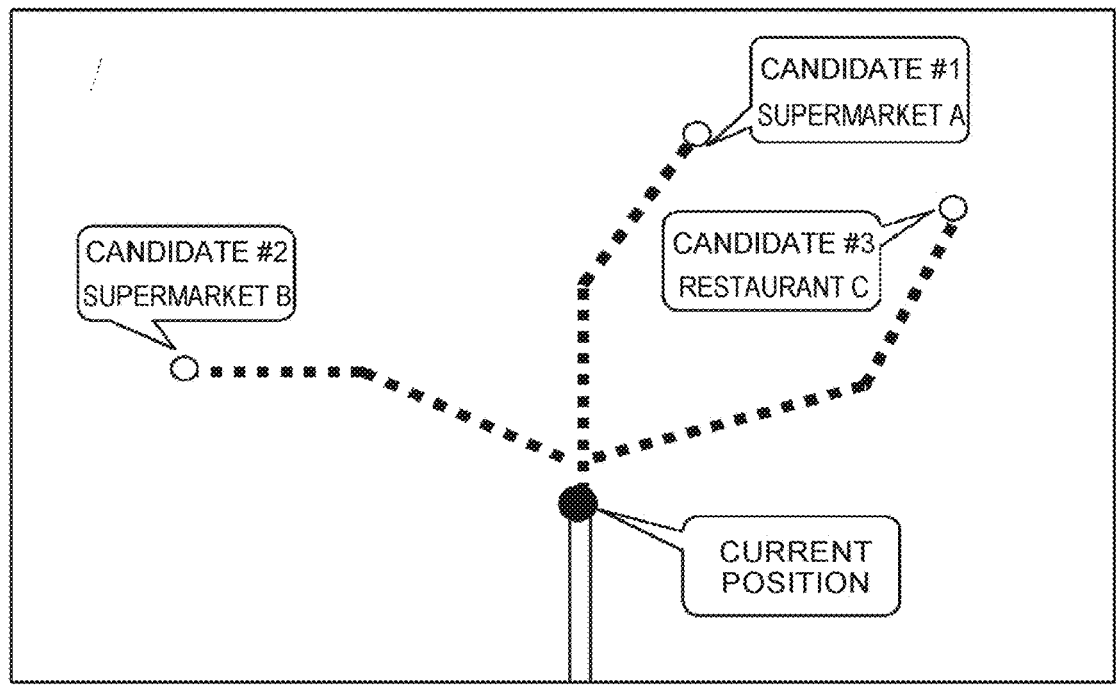
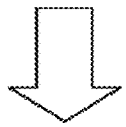
TIME T1 + Δt
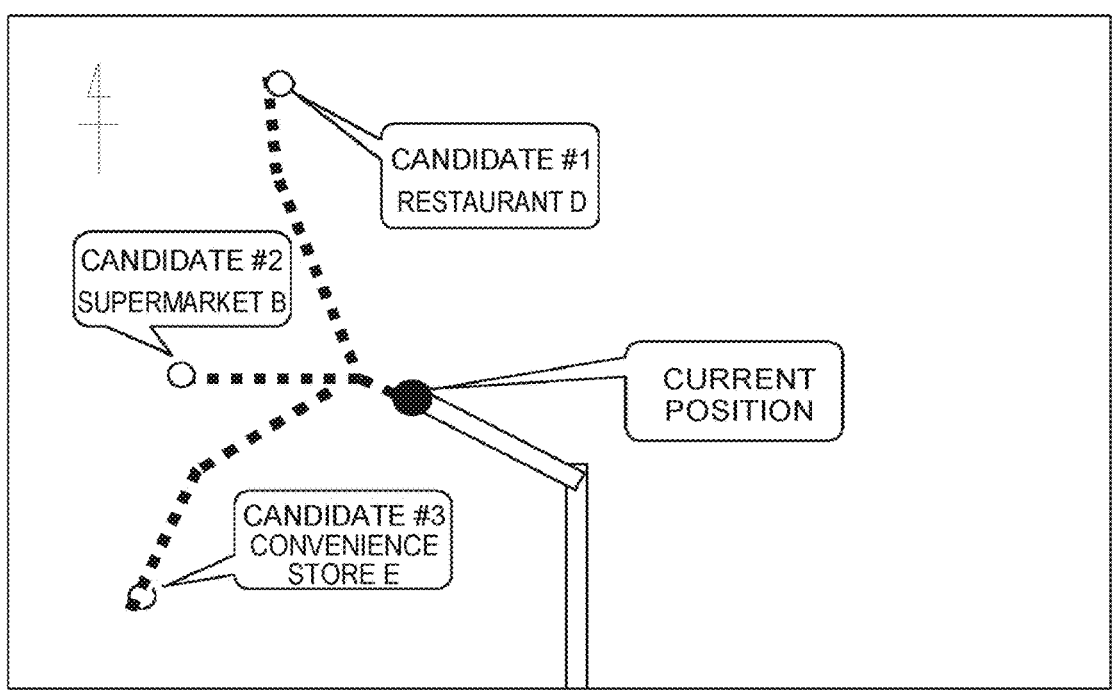

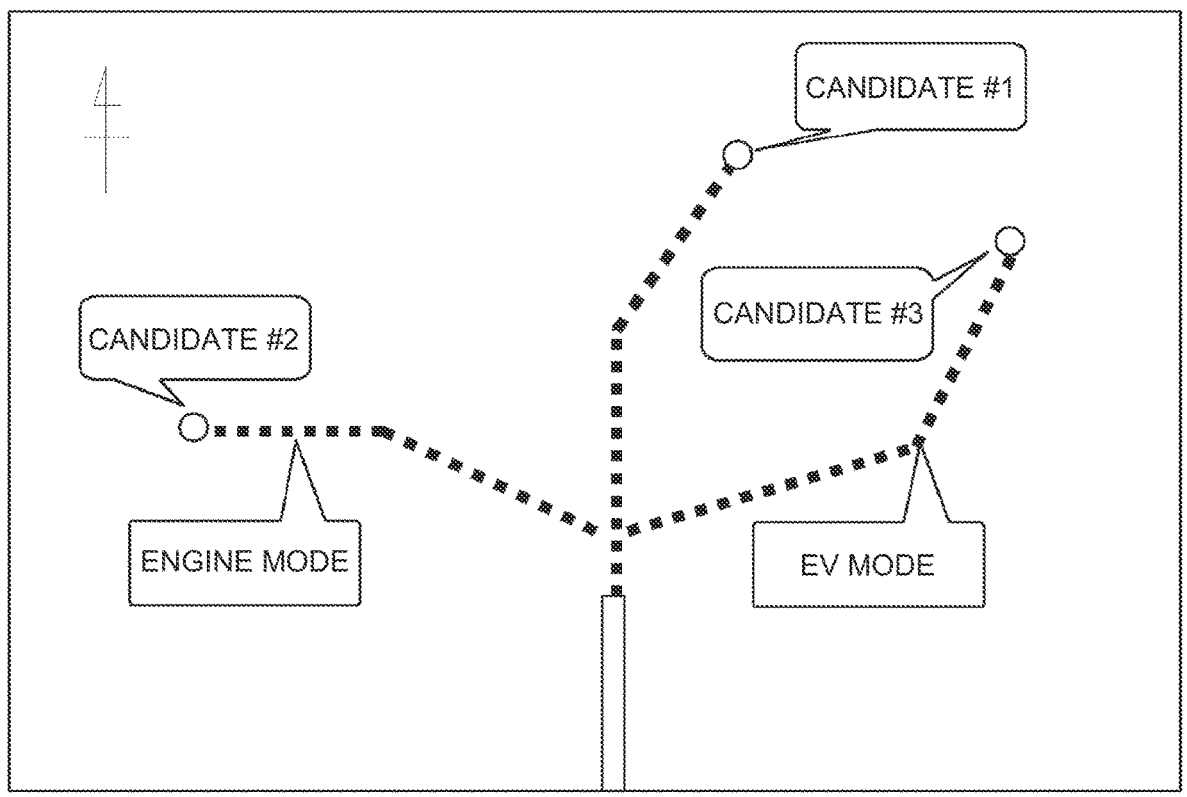

INFORMATION PROCESSING DEVICE, INFORMATION PROCESSING METHOD, AND STORAGE MEDIUM

CROSS-REFERENCE TO RELATED APPLICATION

This application claims priority to Japanese Patent Application No. 2022-005849 filed on Jan. 18, 2022, incorporated herein by reference in its entirety.

BACKGROUND

1. Technical Field

The present disclosure relates to an information processing device, an information processing method, and a storage medium.

2. Description of Related Art

A traffic information guidance system is disclosed that, when an event that may hinder traveling on a road exists ahead in the direction of forward movement up to a destination of a vehicle, identifies a bypass route along which the vehicle is predicted to travel thereafter, based on collected archival travel history, and presents traffic information on the identified route (for example, Japanese Unexamined Patent Application Publication No. 2019-185232).

SUMMARY

An object of one aspect of the disclosure is to provide an information processing device, an information processing method, and a storage medium that make it possible to predict a route that will be traveled by a vehicle, in a state where a destination is not fixed.

An aspect of the present disclosure is an information processing device including a control unit that performs prediction, from a first movement route including a predetermined number of continuous road links, of one or more road links that are traveled by a first mobile object subsequent to the first movement route, based on movement history information on one or more mobile objects traveling on a road.

Another aspect of the present disclosure is an information processing method including: by a computer, performing prediction, from a first movement route including a predetermined number of continuous road links, of one or more road links that are traveled by a first mobile object subsequent to the first movement route, based on movement history information on one or more mobile objects traveling on a road; and outputting the one or more road links as a result of the prediction.

According to any one of the aspects of the present disclosure, accuracy in detection of an obstacle can be enhanced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 shows an example of a sequence of road links in a trip;

FIG. 5 shows an example of information stored in a passage time length DB;

FIG. 6 shows an example of information stored in a branch information DB;

FIG. 8 shows an example of processing of obtaining a predicted route by a second prediction unit;

FIG. 10 shows an example of processing by a ranking determination unit;

FIG. 17 shows an example of an output of predicted routes in a use case of the route prediction processing according to the first embodiment; and FIG. 18 shows an example of an output of predicted routes in another use case of the route prediction processing according to the first embodiment.

DETAILED DESCRIPTION OF EMBODIMENTS

Figure 1:
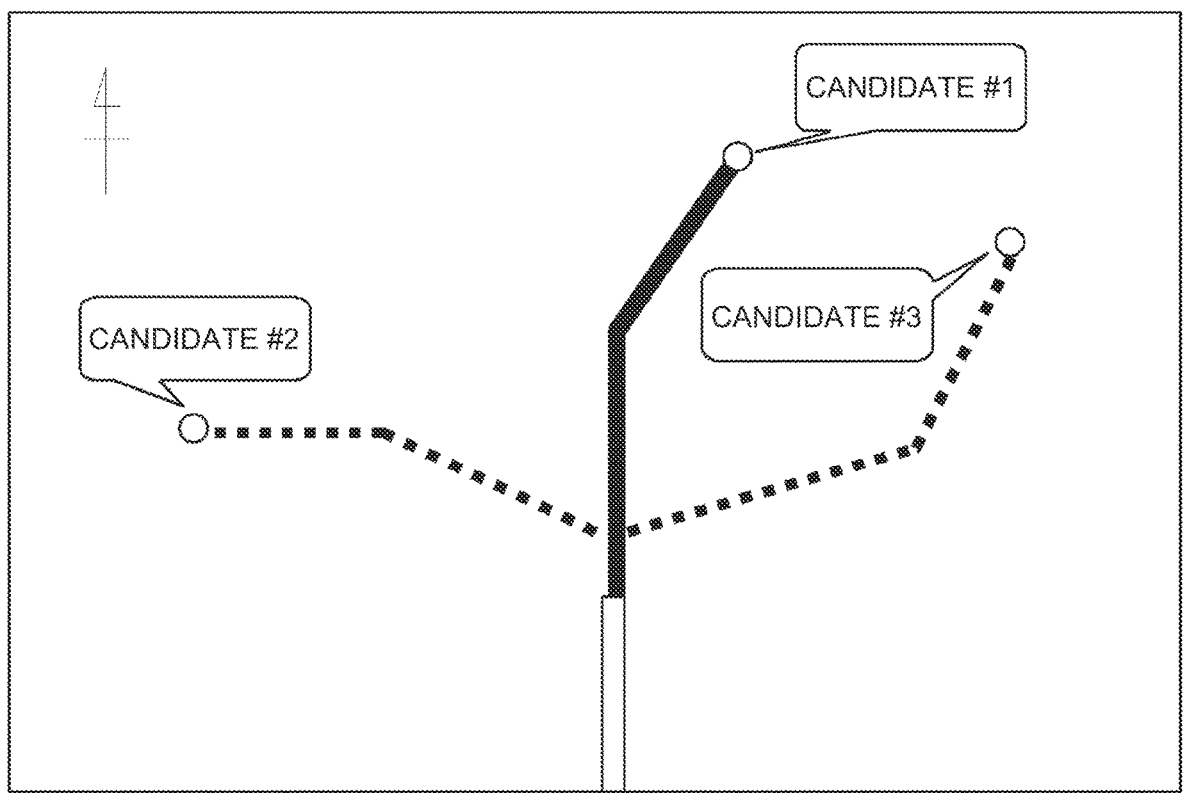
FIG. 1 shows an example of an output of a result of route prediction processing according to a first embodiment.

One aspect of the present disclosure is an information processing device including a control unit that performs prediction, from a first movement route including a predetermined number of continuous road links, of one or more road links that are traveled by a first mobile object subsequent to the first movement route, based on movement history information on one or more mobile objects traveling on a road. The information processing device is, for example, a dedicated computer, an in-vehicle computer, a user terminal such as a smartphone, or the like. The control unit is, for example, a processor such as a central processing unit (CPU). Examples of the mobile object include an automobile, a motorcycle, a bicycle, a pedestrian, and the like. The first mobile object is a mobile object under prediction.

A road link refers to a road section between neighboring nodes when a road is divided at each node. Nodes include intersections existing on roads, characteristic points such as a corner, and points arranged at intervals of a predetermined length. For example, nodes for road links may differ, according to the types of roads such as a general road and an expressway.

According to the one aspect of the present disclosure, a road link that will be next traveled by the first mobile object after the first movement route can be predicted from the first movement route, for example, even without a destination.

In the one aspect of the present disclosure, the control unit may perform the prediction of one or more road links that are traveled by the first mobile object subsequent to the first movement route, by using a machine learning model. The machine learning model may be a machine learning model that, for an input of sequential data, outputs one piece of data or sequential data subsequent to the input sequential data. Moreover, the machine learning model may be trained such as to, for an input of sequential data including the predetermined number of the continuous road links, output one or more road links that are traveled by the first mobile object subsequent to the predetermined number of the continuous road links.

The machine learning model that, for an input of sequential data, outputs one piece of data or sequential data subsequent to the input sequential data is, for example, a model that is commonly used in the field of natural language processing. Examples of such a machine learning model include recurrent neural network (RNN), sequence-to-sequence (Seq2Seq), transformer, BERT, and the like. Training of the machine learning model may be performed by the information processing device according to the one aspect of the present disclosure by using the movement history information on one or more mobile objects for training data, or may be performed beforehand by using predetermined data.

According to the one aspect of the present disclosure, route prediction can be performed by making use of a machine learning model that is used in the field of natural language processing.

In the one aspect of the present disclosure, the information processing device may further include a storage unit that stores first information indicating a relationship between a plurality of road links within a target range. In such a case, the control unit may obtain, by using the machine learning model, a primary predicted route including a plurality of road links, the primary predicted route to be traveled by the first mobile object subsequent to the first movement route. Moreover, the control unit may obtain, based on the first information and the primary predicted route, a predetermined number of secondary predicted routes each including a plurality of road links, the secondary predicted routes to be traveled by the first mobile object subsequent to the first movement route. Further, the control unit may output the primary predicted route and the predetermined number of the secondary predicted routes.

Examples of the first information include information indicating a connection between road links, information indicating a probability of a transition that is a probability at which travel of a mobile object occurs between road links, and the like. For example, the first information may be acquired by the information processing device from the movement history information on one or more mobile objects, or may be prepared in advance. Examples of a form of outputting the primary predicted route and the predetermined number of the secondary predicted routes include display on a display unit, transmission to another device such as an in-vehicle device, output to a file, provision of a printout, and the like.

Since each secondary predicted route is obtained based on the first information and the primary predicted route, the secondary predicted route can be obtained in such a manner that the forward direction of the secondary predicted route does not overlap with those of the primary predicted route, which is obtained by using the machine learning model, and another secondary predicted route. Accordingly, by obtaining the secondary predicted routes based on the first information and the primary predicted route, a wide variety of the predicted routes can be made. A wide variety of the predicted routes refers to, for example, the fact that the forward directions of the predicted routes disperse, and/or do not concentrate in one direction. Note that the forward direction of a route is a direction in which the route extends from a certain point.

In the one aspect of the present disclosure, the control unit may obtain each of the predetermined number of the secondary predicted routes by selecting, from among a plurality of road links branching from a first branch point among one or more branch points on the primary predicted route, a road link subsequent to the first branch point. For example, a branch point may be represented by a road link including the branch point as one end, or by a connecting point or a separating point between road links.

Since the primary predicted route is obtained by using the machine learning model, the primary predicted route is a route that has a fairly high probability of being traveled by the first mobile object subsequent to the first movement route. A secondary predicted route is obtained based on the primary predicted route, whereby the probability of the secondary predicted route being traveled by the first mobile object can be increased, for example, compared to a case where a secondary predicted route is obtained not based on the primary predicted route.

The control unit may obtain the predetermined number of the secondary predicted routes by selecting, from among a plurality of road links branching from a first branch point that first appears on the primary predicted route, the subsequent road link in such a manner as to avoid a concentration in one direction. Thus, more secondary predicted routes that are different from the primary predicted route after the first branch point can be obtained, and variations on the secondary predicted route can be increased.

In the one aspect of the present disclosure, the first information may include, with respect to each of a plurality of second road links branching from a first road link included in the plurality of road links, information indicating a first probability of a transition from the first road link to the second road link. For example, the information indicating a first probability may be the first probability itself, or the number of times a transition occurs from the first road link to the second road link.

When the first information includes a first probability, the control unit may obtain the predetermined number of the secondary predicted routes by selecting, as a road link subsequent to a second branch point that appears after the first branch point, a road link having the higher first probability among a plurality of road links branching from the second branch point. Thus, a secondary predicted route can be obtained as a route with a higher probability of being traveled by the first mobile object.

The control unit may acquire a score of each of the predetermined number of the secondary predicted routes, based on the first probability between each pair of road links at a branch point, and rank the predetermined number of the secondary predicted routes, based on the respective scores of the predetermined number of the secondary predicted routes. The higher the score is, the higher the probability of the second predicted route being traveled by the first mobile object is indicated. By using the scores, for example, a second predicted route to be output can be selected, such as by outputting a predetermined number of superordinate secondary predicted routes with higher scores, or order in which the predetermined number of the secondary predicted routes are recommended can be presented.

In the one aspect of the present disclosure, the control unit may acquire information indicating a rating of each of the primary predicted route and the predetermined number of the secondary predicted routes, and update the first information, based on the information indicating the ratings. Specifically, the control unit may update the first information in such a manner that an increase occurs in the first probability between two road links at each of one or more branch points included in a predicted route given a high rating that is indicated by the information indicating the rating, among the primary predicted route and the predetermined number of the secondary predicted routes. Moreover, the control unit may update the first information in such a manner that a decrease occurs in the first probability between two road links at each of one or more branch points included in a predicted route given a low rating that is indicated by the information indicating the rating, among the primary predicted route and the predetermined number of the secondary predicted routes.

Examples of the information indicating the rating that indicates a high rating include travel history information indicating that the first mobile object has traveled the predicted route, a user rating indicating "good", and the like. Examples of the information indicating the rating that indicates a low rating include travel history information indicating that the first mobile object has not traveled the predicted route, a user rating indicating "bad", and the like. According to the one aspect of the present disclosure, for a secondary predicted route that is obtained based on the first information, the probability of being traveled by the first mobile object can be increased.

As another aspect of the present disclosure, an information processing method performed by a computer can be specified. The information processing method is a method including: by a computer, performing prediction, from a first movement route including a predetermined number of continuous road links, of one or more road links that are traveled by a first mobile object subsequent to the first movement route, based on movement history information on one or more mobile objects traveling on a road; and outputting, as a result of the prediction, the one or more road links that are predicted to be traveled by the first mobile object subsequent to the first movement route.

As a still another aspect of the present disclosure, a program for causing a computer to perform the processing by the information processing device described above, as well as a non-transitory computer-readable recording medium storing the program, can also be specified.

Hereinafter, an embodiment of the present disclosure is described with reference to the drawings. Configurations in the embodiment below are presented for illustrative purposes, and the present disclosure is not limited to the configurations in the embodiment.

First Embodiment

FIG. 1 shows an example of an output of a result of route prediction processing according to a first embodiment. In the route prediction processing according to the first embodiment, a predetermined number of predicted routes that are predicted to be traveled next by a vehicle are obtained from a movement route followed by the vehicle immediately before prediction. In the first embodiment, the number of predicted routes to be obtained and a time range for the predicted routes to be obtained are designated by a user.

In the route prediction processing according to the first embodiment, first, a first predicted route is obtained by using a machine learning model. Next, a plurality of predicted routes is obtained based on the first predicted route and information indicating relationships between road links. As a result, a plurality of the predicted routes subsequent to the movement route followed by the vehicle immediately before prediction can be obtained in such a manner that the forward directions of the routes disperse without concentrating in a particular direction.

In the example shown in FIG. 1, three predicted routes are obtained from the movement route followed by the vehicle immediately before prediction. The route as a candidate #1 is a predicted route obtained by using the machine learning model. The predicted routes as a candidate #2 and a candidate #3 are routes obtained based on the information indicating relationships between road links. As shown in FIG. 1, the three predicted routes disperse, without the respective forward directions thereof concentrating in one direction. Note that in the example shown in FIG. 1, a correct route that is selected by the vehicle is indicated by a solid line, and routes that are not selected by the vehicle are indicated by broken lines.

Figure 2:
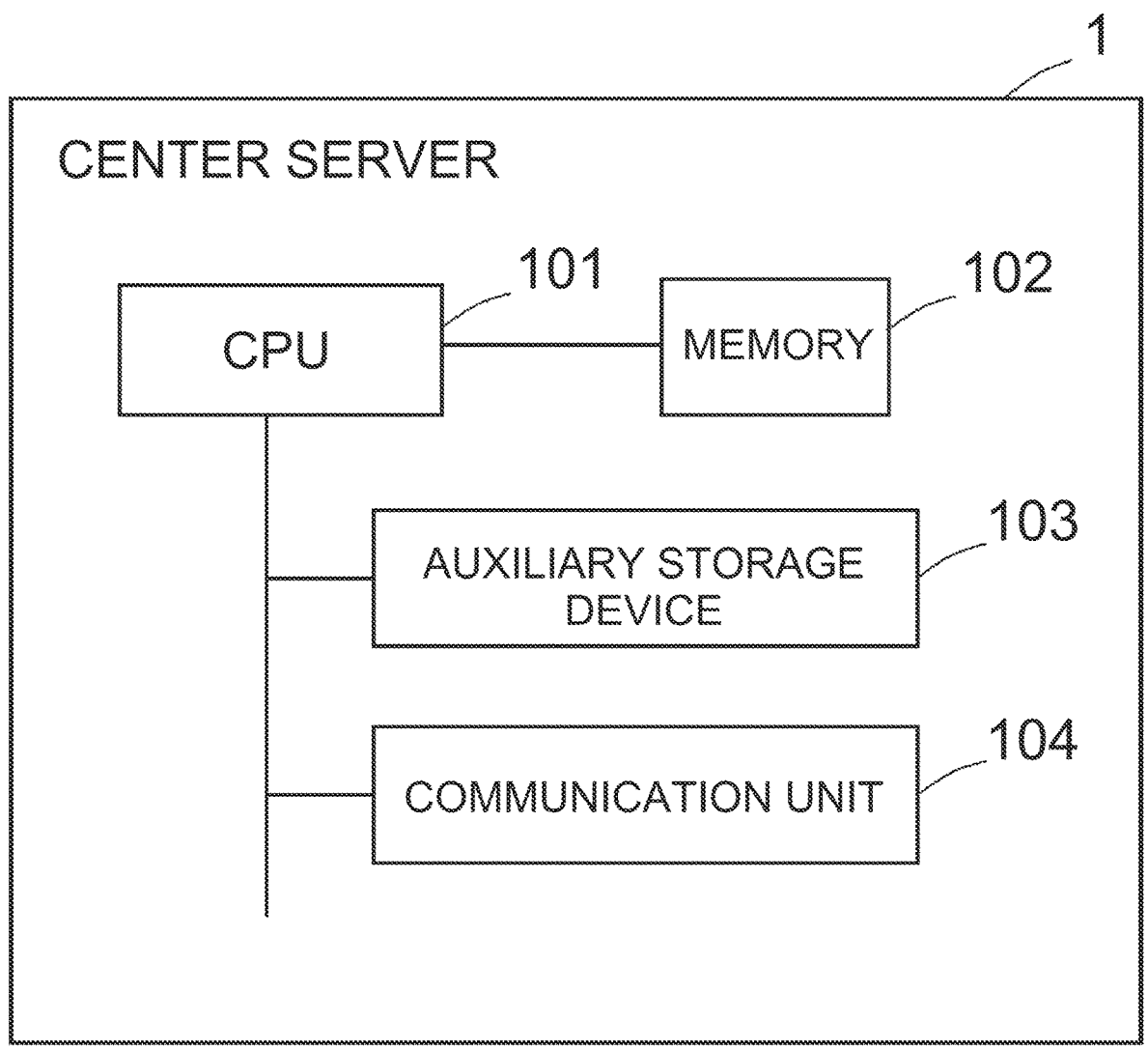
FIG. 2 shows an example of a hardware configuration of a center server.

FIG. 2 shows an example of a hardware configuration of a center server. In the first embodiment, a description is given, assuming that the center server 1 performs the route prediction processing. However, an entity that executes the route prediction processing is not limited to the center server 1, and may be, for example, any one of an in-vehicle device and user terminals, such as a smartphone and a personal computer (PC).

The center server 1 is, for example, an information processing device, a dedicated computer, or a computer in which a program for the route prediction processing according to the first embodiment is installed. The center server 1 is, for example, a server included in a system that provides a predetermined service to a vehicle.

The center server 1 includes, as hardware components, a CPU 101, a memory 102, an auxiliary storage device 103, and a communication unit 104. The memory 102 and the auxiliary storage device 103 are computer-readable recording media.

The auxiliary storage device 103 stores various programs, and data to be used by the CPU 101 when each program is executed. The auxiliary storage device 103 is, for example, a hard disk drive (HDD), a solid state drive (SSD), an erasable programmable ROM (EPROM), or a flash memory. Examples of the programs stored in the auxiliary storage device 103 include an operating system (OS), a machine learning model program, a route prediction program, and the like. The machine learning model program is a program for executing inference by the machine learning model and training of the machine learning model. The route prediction program is a program for predicting a subsequent route from a movement route of a vehicle under prediction.

The memory 102 is a storage device that provides the CPU 101 with a storage area and a working area on which a program stored in the auxiliary storage device 103 is loaded, and that is also used for a buffer. The memory 102 includes, for example, semiconductor memories such as a read only memory (ROM) and a random access memory (RAM).

The CPU 101 performs various processing by loading and executing, on the memory 102, the OS stored in the auxiliary storage device 103 and other various programs. The number of CPUs 101 is not limited to one, and a plurality of CPUs 101 may be included.

The communication unit 104 connects to, for example, a wired network or a wireless network. The communication unit 104 is, for example, a network interface card (NIC), a wireless local area network (LAN) card, a wireless circuit for connecting to a mobile telephone network, or the like. Data and the like received by the communication unit 104 are output to the CPU 101. Note that the hardware components of the center server 1 are not limited to the components shown in FIG. 2.

Figure 3:
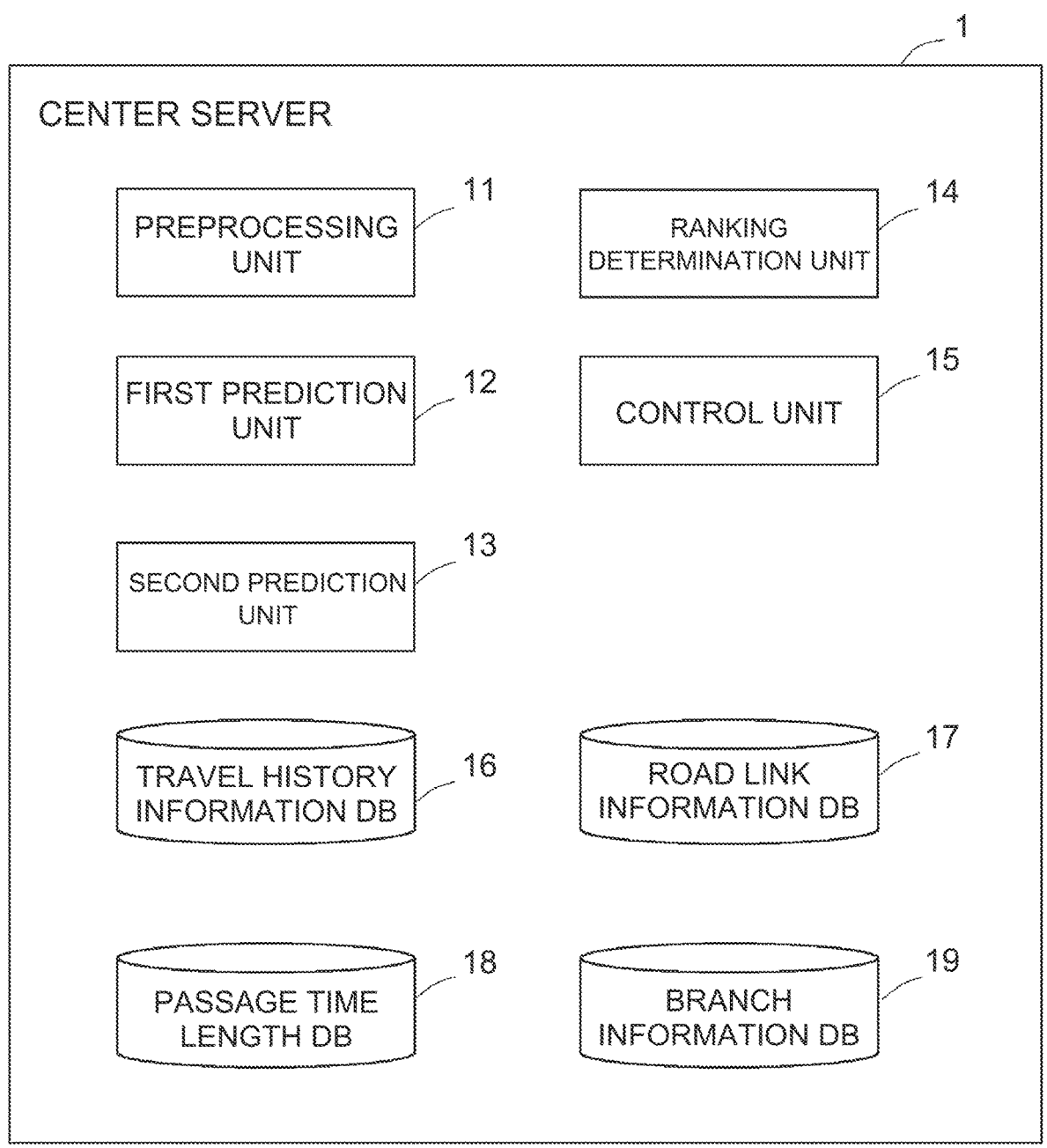
FIG. 3 shows an example of a functional configuration of the center server.

FIG. 3 shows an example of a functional configuration of the center server 1. The center server 1 includes, as functional components, a preprocessing unit 11, a first prediction unit 12, a second prediction unit 13, a ranking determination unit 14, a control unit 15, a travel history information DB 16, a road link information DB 17, a passage time length DB 18, and a branch information DB 19. The functional components are implemented, for example, by the CPU 101 executing the route prediction program stored in the auxiliary storage device 103.

The travel history information DB 16, the road link information DB 17, the passage time length DB 18, and the branch information DB 19 are databases created in the storage area of the auxiliary storage device 103. The travel history information DB 16 stores travel history information for a predetermined time period on a plurality of vehicles. Examples of the plurality of vehicles include vehicles for which the center server 1 provides the service, and several tens or several hundreds of vehicles, such as vehicles at a certain vehicle manufacturer.

The travel history information on the vehicles is, for example, information called probe information, and information that is collected from each vehicle in each predetermined time period. The travel history information is transmitted from each vehicle, for example, at predetermined time intervals in a range of 0.1 seconds to one second. The travel history information includes, for example, unique identification information on an in-vehicle device, a timestamp, and detection values detected by various sensors mounted in the vehicle. Examples of the detection values detected by the various sensors mounted in the vehicle, which are included in the travel history information, include position information, vehicle speed, the fact that an ignition is turned on or off, and the like. The position information included in the travel history information is, for example, a latitude and a longitude acquired by a global positioning system (GPS) receiver mounted in the vehicle or the in-vehicle device. Note that the information included in the travel history information is not limited to the unique identification information on the in-vehicle device, the timestamp, the position information, the vehicle speed, and the fact that the ignition is turned on or off. The travel history information on a vehicle is an example of "movement history information" on a "mobile object".

The road link information DB 17 stores information related to a road link included in a predetermined geographical range. A road link is a road section between neighboring nodes when a road divided at each node. For example, in a case of a general road, nodes are intersections existing on roads, and characteristic points such as a corner. Accordingly, in the case of a general road, a road link is a section from a characteristic point, such as an intersection and a corner, to a next characteristic point. For example, in a case of an expressway, nodes are points arranged at intervals of a predetermined length. In the case of an expressway, a road link is a section separated to the predetermined length.

Identification information is assigned to each road link. The road link information DB 17 stores identification information on a road link and position information on the road link in association with each other. The position information on a road link may be represented, for example, by ranges of latitudes and longitudes included in the road link, or by the longitude and the latitude of the center point of the road link and a distance from the center point. A method for representing the position information on a road link is not limited to a particular method. The geographical range of road links stored in the road link information DB 17 is, for example, a whole area of Japan, an area in a prefecture unit, an area set based on a predetermined definition, or the like.

The passage time length DB 18 stores an average time length taken by vehicles to pass through each road link. The branch information DB 19 stores information related to a relationship between road links. Details of the passage time length DB 18 and the branch information DB 19 will be described later. The information stored in the branch information DB 19 is an example of "first information".

The preprocessing unit 11 performs preprocessing for performing route prediction. The processing performed by the preprocessing unit 11 includes training processing for training a machine learning model by using the travel history information for the predetermined time period stored in the travel history information DB 16, and updating processing for updating the passage time length DB 18 and the branch information DB 19 based on the travel history information for the predetermined time period stored in the travel history information DB 16. Details of the processing by the preprocessing unit 11 will be described later.

The first prediction unit 12 obtains a first predicted route from a movement route of a vehicle under prediction, by using the machine learning model. The first prediction unit 12 starts obtaining the first predicted route, upon receiving an instruction from the control unit 15, which will be described later. The first prediction unit 12 outputs the obtained first predicted route to the control unit 15. Details of the processing of obtaining a first predicted route by the first prediction unit 12 by using the machine learning model will be described later.

The second prediction unit 13 obtains a predetermined number of predicted routes, based on the branch information DB 19 and the first predicted route obtained by the first prediction unit 12. The number of the predicted routes obtained by the second prediction unit 13 is a number calculated by subtracting one from a designated number. For example, for one or more branch points, in order of appearance thereof, on the first predicted route, the second prediction unit 13 selects a next link from among a plurality of branching road links, and thereby creates the predetermined number of predicted routes. The second prediction unit 13 starts the processing of obtaining the predicted routes, upon receiving an instruction from the control unit 15, and outputs the predetermined number of the obtained predicted routes to the control unit 15. Details of the processing of obtaining a predetermined number of predicted routes by the second prediction unit 13 will be described later. Hereinafter, the first predicted route obtained by the first prediction unit 12 is referred to as "primary predicted route". Hereinafter, the second and subsequent predicted routes obtained by the second prediction unit 13 are referred to as "secondary predicted routes".

The ranking determination unit 14 ranks the predetermined number of the secondary predicted routes obtained by the second prediction unit 13. For example, the ranking determination unit 14 acquires respective scores of the secondary predicted routes, and ranks the predetermined number of the secondary predicted routes in descending order of the scores. The score of a secondary predicted route is acquired based on a probability of a transition between road links. The probability of a transition between road links is the probability that after one road link, a vehicle next travels the other road link. For example, the probability of a transition between two continuous road links A and B is the probability that a vehicle next travels the road link B after the road link A. Note that the probability of a transition from the road link A to the road link B is different from the probability of a transition from the road link B to the road link A. The probability of a transition between road links is acquired from the branch information DB 19, which will be described later. The ranking determination unit 14 starts the processing, upon receiving an instruction from the control unit 15, and outputs a result of ranking the predetermined number of the secondary predicted routes to the control unit 15.

The control unit 15 performs control of the route prediction processing. The control unit 15 controls start and termination of the route prediction processing. The control unit 15 causes the route prediction processing to be started when receiving an input of an instruction to start the route prediction processing. For example, the instruction to start the route prediction processing may be input into the center server 1 through user operation, or may be received from a user terminal via the network. Along with the instruction to start the route prediction processing, information on a movement route followed by a vehicle under prediction immediately before prediction is also input. The information on the movement route followed by the vehicle immediately before prediction may be the travel history information for a relevant time period, or may be sequential data of road links. Moreover, the information on the movement route followed by the vehicle immediately before prediction may be information acquired from the vehicle in real time, may be virtual information created, or may be a route with a high frequency of appearance, depending on a use case of the route prediction processing.

For example, the control unit 15 instructs the preprocessing unit 11, the first prediction unit 12, the second prediction unit 13, and the ranking determination unit 14 to start the respective processing, outputs a predicted route or predicted routes as a result of the route prediction processing, and updates the travel history information DB 16, the road link information DB 17, the passage time length DB 18, and the branch information DB 19. Details of the processing by the control unit 15 will be described later.

Note that the functional components of the center server 1 shown in FIG. 3 are an example, and the functional components of the center server 1 is not limited to the components as shown in FIG. 3. For example, the travel history information DB 16 and the road link information DB 17 may be retained by another server.

The processing by the preprocessing unit 11 is described by using FIGS. 4, 5, and 6. FIG. 4 shows an example of a sequence of road links in a trip. The preprocessing unit 11 acquires a trip of each vehicle from the travel history information stored in the travel history information DB 16. A trip is, for example, travel of a vehicle from when an ignition is turned on until the ignition is turned off. The preprocessing unit 11 acquires the trip as a sequence of road links that are road links traveled by the vehicle, arranged in order of timestamps, as shown in FIG. 4. Specifically, each trip is acquired as follows.

For example, the preprocessing unit 11 classifies the travel history information, based on unique identification information on each in-vehicle device. With respect to unique identification information on one in-vehicle device, the preprocessing unit 11 acquires, as the travel history information in one trip of a vehicle, a plurality of pieces of travel history information included in a range of the travel history information indicating that the ignition is turned on, to the travel history information indicating that the ignition is turned off, in order of timestamps.

The preprocessing unit 11 identifies each road link traveled by the vehicle, from position information included in the travel history information, by referring to the road link information DB 17. Since travel history information is created, for example, in each period of 0.1 seconds to one second, a plurality of pieces of travel history information may be created while a vehicle travels through one road link. When there is a plurality of pieces of travel history information, with respect to one road link, that are temporally consecutive and include unique identification information on the same in-vehicle device, the preprocessing unit 11 adopts, for example, a timestamp indicating the earliest clock time, as a timestamp of the road link. However, the clock time adopted as the timestamp of the road link may be a clock time in the middle of a time period indicated by the plurality of temporally consecutive pieces of travel history information that include the unique identification information on the same in-vehicle device, and that correspond to the road link.

FIG. 5 shows an example of information stored in the passage time length DB 18. The passage time length DB 18 stores an average time length for passage through each road link. Specifically, one record in the passage time length DB 18 includes fields of link ID and average time length for passage. In the field of link ID, identification information on a road link is stored. In the field of average time length for passage, an average value of time lengths required for vehicles to pass through the road link.

For the sequence of road links in each trip, the preprocessing unit 11 acquires a time length for passage through each road link, from each time interval between the timestamps of the individual road links, and updates the passage time length DB 18 by using the acquired time lengths for passage through the road links. In an example of a trip #1 shown in FIG. 4, the preprocessing unit 11 acquires, as a time length for passage through a link #1, a time length from the timestamp of the link #1 to the timestamp of a link #2. For a method for acquiring an average time length for passage through a road link, for example, as well known, a total value of time lengths for passage through the road link is divided by the number of passages.

FIG. 6 shows an example of information stored in the branch information DB 19. The branch information DB 19 stores information related to a branch point. Specifically, one record in the branch information DB 19 includes fields of branch point and next link. In the field of branch point, identification information on a road link that forms a branch point.

In the field of next link, identification information on road links that connect to the road link indicated in the field of branch point. The road links connecting to the road link indicated in the field of branch point are links with a probability of being next traveled by a vehicle after the road link indicated in the field of branch point. Hereinafter, a road link that is next traveled by a vehicle after one road link is referred to as "next link". In other words, the road links included in the field of next link can also be said to be candidate road links for the next link after the road link indicated in the field of branch point.

Moreover, in the field of next link, the identification information on the road links is ranked in descending order of the number of times a road link is selected as the next link after the road link indicted in the field of branch point. For example, the number of times a road link B is selected as the next link after a road link A serving as a branch point can also be said to be the number of times a vehicle transitions from the road link A to the road link B. Accordingly, the number of times a road link is selected as the next link after a road link indicated in the field of branch point is referred to as "the number of transitions". In the field of next link, the number of transitions from a road link indicated in the field of branch point is also presented in parentheses along with each road link.

The example shown in FIG. 6 illustrates that candidates for the next link after a road link #4 that forms a branch point include a road link #5, a road link #6, and a road link #7. The numbers of transitions from the road link #4 are six to the road link #5, five to the road link #6, and four to the road link #7. Accordingly, in rankings of the number of times a road link is selected as the next link after the road link #4, the road link #5 is first, the road link #6 is second, and the road link #7 is third.

Based on the number of transitions from the road link #4 to each candidate road link for the next link, a probability of a transition from the road link #4 to each candidate road link for the next link can be obtained. For example, the probability of a transition from the road link #4 to a road link that is a candidate for the next link is obtained by dividing the number of transitions from the road link #4 to the road link by a total sum of the numbers of transitions from the road link #4 to all the candidate road links for the next link.

In the sequences of road links in the trips, the preprocessing unit 11 detects one or more combinations as a transition from one road link (transition source) to another road link (transition destination). The preprocessing unit 11 updates the branch information DB 19, with the transition-source road link as a branch point, and each transition-destination road link as a candidate for the next link after the road link as the branch point. The example of the branch information DB 19 shown in FIG. 6 illustrates only records of road links (branch points) having a plurality of road links as candidates for the next link. However, a record of a road link having no branch may be registered in the branch information DB 19. For a record of a road link having no branch, for example, only identification information on one road link is stored in the field of next link. For a record of a road link having a dead end, the field of next link is empty.

Note that the information stored in the branch information DB 19 shown in FIG. 6 is an example, and information stored in the branch information DB 19 is not limited to the information shown in FIG. 6. For example, a probability of a transition may be stored in place of the number of transitions. A probability of a transition is an example of a "first probability of a transition from a first road link to a second road link" and "information indicating the first probability". The number of transitions is an example of the "information indicating the first probability".

Figure 7:
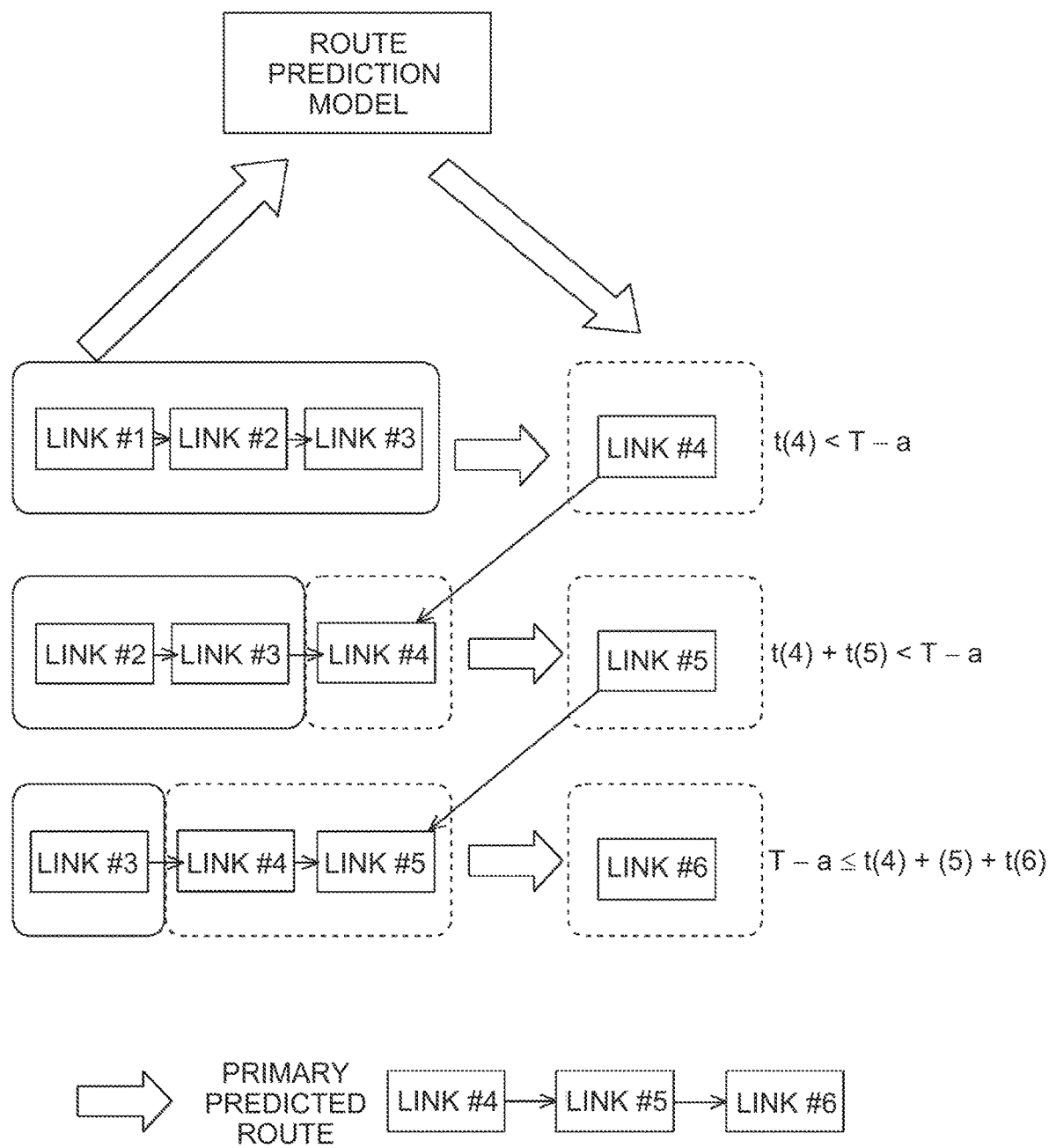
FIG. 7 shows an example of processing of obtaining a primary predicted route by a first prediction unit.

FIG. 7 shows an example of the processing of obtaining a primary predicted route by the first prediction unit 12. The first prediction unit 12 obtains a primary predicted route by using the machine learning model. The machine learning model used is a model that transforms sequential data into one piece of data or another sequential data. Examples of the machine learning model used to obtain a primary predicted route include a recurrent neural network (RNN), a sequence-to-sequence (Seq2Seq), a transformer, a BERT, and the like. Any one of such models may be used. Such machine learning models are used in the field of natural language processing in many cases. In FIG. 7, machine learning used to obtain a primary predicted route is presented as a "route prediction model".

The route prediction model in the example shown in FIG. 7 outputs one road link to be a next link, for an input of sequential data including three road links. As an example, FIG. 7 shows an example in a case where a movement route of a vehicle under route prediction is a road link #1→a road link #2→a road link #3. In FIG. 7, a road link included in the movement route of the vehicle is enclosed by a solid line, and a road link included in a predicted route is enclosed by a broken line.

First, the first prediction unit 12 inputs, as input sequential data, the road link #1→the road link #2→the road link #3 that are the movement route of the vehicle. As an output from the route prediction model for the input of the movement route, a road link #4 is obtained. In other words, the route prediction model predicts the road link #4 as the next link after the road link #1→the road link #2→the road link #3. Since an average time length t(4) for passage through the road link #4 is less than T−α, the first prediction unit 12 causes the route prediction model to further predict a next link after the road link #4. α is, for example, an average time length for passage through all road links, a value of the longest one of average time lengths for passage through the individual road links, or a fixed value. The first prediction unit 12 acquires the average time length for passage through each road link from the passage time length DB 18.

Next, by using the road link #4 obtained through the previous prediction, the first prediction unit 12 inputs the road link #2→the road link #3→the road link #4, as input sequential data to the route prediction model. A road link #5 is obtained as an output from the route prediction model for the input. In other words, the route prediction model predicts the road link #5 as the next link after the road link #2→the road link #3→the road link #4. Since a sum of the average time length t(4) for passage through the road link #4 and an average time length t(5) for passage through the road link #5 is less than T−α in route prediction, the first prediction unit 12 causes the route prediction model to further predict a road link subsequent to the road link #5. The sum of the average time length t(4) for passage through the road link #4 and the average time length t(5) for passage through the road link #5 is an average time length required to pass through the primary predicted route currently obtained, and can be regarded as a predicted time length. Accordingly, hereinafter, a time length predicted to be required to pass through a predicted route is referred to as a predicted time length for passage. In the first embodiment, a predicted time length for passage through a predicted route is a total time length of respective average time lengths for passage through road links included in the predicted route.

Next, by using the road link #4 and the road link #5 obtained up until the previous prediction, the first prediction unit 12 inputs the road link #3→the road link #4→the road link #5, as input sequential data to the route prediction model. A road link #6 is obtained as an output from the route prediction model for the input. In other words, the route prediction model predicts the road link #6 as the next link after the road link #3→the road link #4→the road link #5. Since a sum of the average time length t(4) for passage through the road link #4, the average time length t(5) for passage through the road link #5, and an average time length t(6) for passage through the road link #6 is equal to or more than T−α in route prediction, the first prediction unit 12 stops route prediction using the route prediction model here. Consequently, the first prediction unit 12 obtains the road link #4→the road link #5→the road link #6, as a primary predicted route.

Note that the processing of obtaining a primary predicted route shown in FIG. 7 is an example, and processing of obtaining a primary predicted route is not limited to the processing shown in FIG. 7. A size of sequential data of road links to be an input to the route prediction model is not limited to three road links. Moreover, the route prediction model is not limited to a model that outputs one road link, and may be a model that outputs two or more road links, that is, sequential data of road links. When travel history information for the predetermined time period is input from the control unit 15, as information indicating a movement route of a vehicle under route prediction, the first prediction unit 12 acquires sequential data of road links from the travel history information and then inputs the sequential data into the route prediction model.

Training of the route prediction model is performed, for example, in each predetermined period, or when a predetermined event occurs. The period in which training of the route prediction model is performed is, for example, once a day, once a week, once a month, or the like. Examples of the event that prompts training of the route prediction model include start of the route prediction processing, reception of an instruction to start training, and the like. Training of the route prediction model may be performed, for example, by the preprocessing unit 11 or the control unit 15.

In training of the route prediction model, a sequence of road links in a trip acquired from the travel history information is teaching data. For example, a case is taken as an example where the route prediction model receives sequential data of three road links as an input and outputs one road link, as shown in FIG. 7. In the case of the example, training of the route prediction model is performed through following processes (1) to (3).

(1) Of a sequence of road links in one trip acquired from the travel history information, three continuous road links are input into the route prediction model, and a road link output from the route prediction model is obtained. (2) The output road link is compared with a next link after the three road links in the sequence of road links in the trip, and a parameter of the route prediction model is adjusted based on a difference. (3) The processes (1) and (2) are iterated until a condition for terminating the training is satisfied.

The condition for terminating the training is, for example, the fact that the number of times the processes (1) and (2) are performed reaches a predetermined number, or the fact that the difference between an output from the route prediction model and the teaching data becomes less than a predetermined value. Note that a method for training the route prediction model is determined according to a type of a machine learning model adopted as the route prediction model.

FIG. 8 shows an example of the processing of obtaining a predicted route by the second prediction unit 13. The second prediction unit 13 obtains a predetermined number of secondary predicted routes, based on a primary predicted route obtained by the first prediction unit 12 and the branch information DB 19. A movement route of a vehicle under prediction, a primary predicted route, a designated number for predicted routes, and a designated time length for the predicted routes are input into the second prediction unit 13, for example, from the control unit 15.

With respect to one or more branch points included in the primary predicted route, for example, in order starting from a branch point that first appears on the primary predicted route, the second prediction unit 13 determines a road link to be a next link in such a manner that the road link makes a different route from the primary predicted route and another secondary predicted route previously determined, and after the determined road link, determines next links in descending order of rankings. Thus, the second prediction unit 13 obtains the predetermined number of secondary routes. A method in which another route is created by being branched from a branch point that appears earlier in a base route such as to be different from the base route, as described above, is referred to as Shallow First. In the first embodiment, a primary predicted route is used for a base route.

More specifically, in the first embodiment, a secondary predicted route is created by determining a next link after a branch point in accordance with following rules (A) to (C). (A) When a next link is selected at a branch point P on a primary predicted route, a road link that is a next link after the branch point P on the primary predicted route, and a road link that is a next link after the branch point P on the primary predicted route according to another secondary predicted route are excluded. (B) At any branch point, when a next link is selected, a road link immediately preceding a road link that corresponds to the branch point is excluded. (C) For a next link after a branch point, a road link with a higher ranking is selected.

The rule (A) is to disperse the forward directions of secondary predicted routes and make a wide variety of the secondary predicted routes. The rule (B) is to prevent a secondary predicted route from going back to a route that has been traveled by a vehicle.

Obtaining of a first secondary predicted route is finished when an average time length t for passage through all road links included in the secondary predicted route exceeds a value calculated by subtracting the allowance a from the designated time length T. When the number S of branch points included in the primary predicted route is equal to or larger than N−1, the processing of obtaining the predetermined number of secondary predicted routes is finished when the number n of obtained secondary predicted routes reaches N−1. When the number S of branch points included in the primary predicted route is smaller than N−1, the processing of obtaining the predetermined number of secondary predicted routes is finished when the number n of obtained secondary predicted routes reaches S. This is because when the number S of branch points included in the primary predicted route is smaller than N−1, an upper limit value for the number of secondary predicted routes to be obtained through the above-described Shallow First is the number S of branch points included in the primary predicted route.

FIG. 8 shows a specific example of part of a primary predicted route and part of the branch information DB 19. In the example shown in FIG. 8, the primary predicted route is a route in which a road link #4, a road link #5, and a road link #6 that form branch points appear in the order of the road link #4, the road link #5, the road link #6. In FIG. 8, for simplicity of description, the primary predicted route is presented by using only the road links that form branch points because a route between road links that form branch points is uniquely determined even if the route includes one or more road links. Accordingly, for example, the primary predicted route shown in FIG. 8 may include another road link in some cases, or may include no road link in some cases, between the road link #4 and the road link #5.

In the first embodiment, first, the second prediction unit 13 determines a branch point that first appears on the primary predicted route, as a first appearing branch point, for every secondary predicted route. In the example shown in FIG. 8, for every secondary predicted route, the first appearing branch point is determined to be the road link #4, which is a branch point that first appears on the primary predicted route.

Next, the second prediction unit 13 refers to the branch information DB 19, and selects, from among the road link #5 and the road link #6 that are candidates for the next link after the road link #4, the road link #6 as the next link after the road #4 in accordance with the rules (A) to (C). This is because the road link #5 is excluded based on the rule (B).

Referring to the branch information DB 19, the road link #6 also forms a branch point. Accordingly, the second prediction unit 13 refers to the branch information DB 19, and selects, from among a road link #9 and a road link #10 into which the road link #6 branches, the road link #9 with a higher ranking as the next link after the road link #6 in accordance with the rules (B) and (C).

Here, a sum of an average time length t(4) for passage through the road link #4 and an average time length t(6) for passage through the road link #6 is less than T−α, and a sum of t(4), t(6), and an average time length t(9) for passage through the road link #9 is equal to or more than T−α. In such a case, the second prediction unit 13 ceases to further determine a next link, and determines that the first secondary predicted route is the road link #4→the road link #6→the road link #9.

Next, the second prediction unit 13 obtains a second secondary predicted route. In the second secondary predicted route, the first appearing branch point is also the road link #4 forming a branch point that first appears on the primary predicted route. Next, the second prediction unit 13 refers to the branch information DB 19, and acquires the road link #5 and the road link #6 into which the road link #4 branches. The road link #5 and the road link #6 overlap with the primary predicted route and the first secondary predicted route already created. Accordingly, the second prediction unit 13 determines, as a second appearing branch point, the road link #5 forming a branch point that second appears on the primary predicted route.

Since the road link #5 forms a branch point, the second prediction unit 13 refers to the branch information DB 19, and selects, from among the road link #6, the road link #10, and the road link #4 into which the road link #5 branches, the road link #10 with a higher ranking as the next link after the road link #5 in accordance with the rules (A) to (C). This is because the road link #6 is excluded based on the rule (A). Moreover, the road link #4 is excluded based on the rule (B).

Since the road link #10 does not form a branch point but connects to a road link #11, the second prediction unit 13 determines the road link #11 as the next link. Here, a sum of the average time length t(4) for passage through the road link #4, the average time length t(5) for passage through the road link #5, and an average time length t(10) for passage through the road link #10 is less than T−α, and a total time length of t(4), t(6), t(10), and an average time length t(11) for passage through the road link #11 is equal to or more than T−α. In such a case, the second prediction unit 13 ceases to further determine a next link, and determines that the second secondary predicted route is the road link #4→the road link #5→the road link #10→the road link #11.

Thereafter, a secondary predicted route is similarly obtained until the number of obtained secondary predicted routes reaches N−1 (when N<S), or until the number of obtained secondary predicted routes reaches the number S of branch points on the primary predicted route (when S<N).

Figure 9:
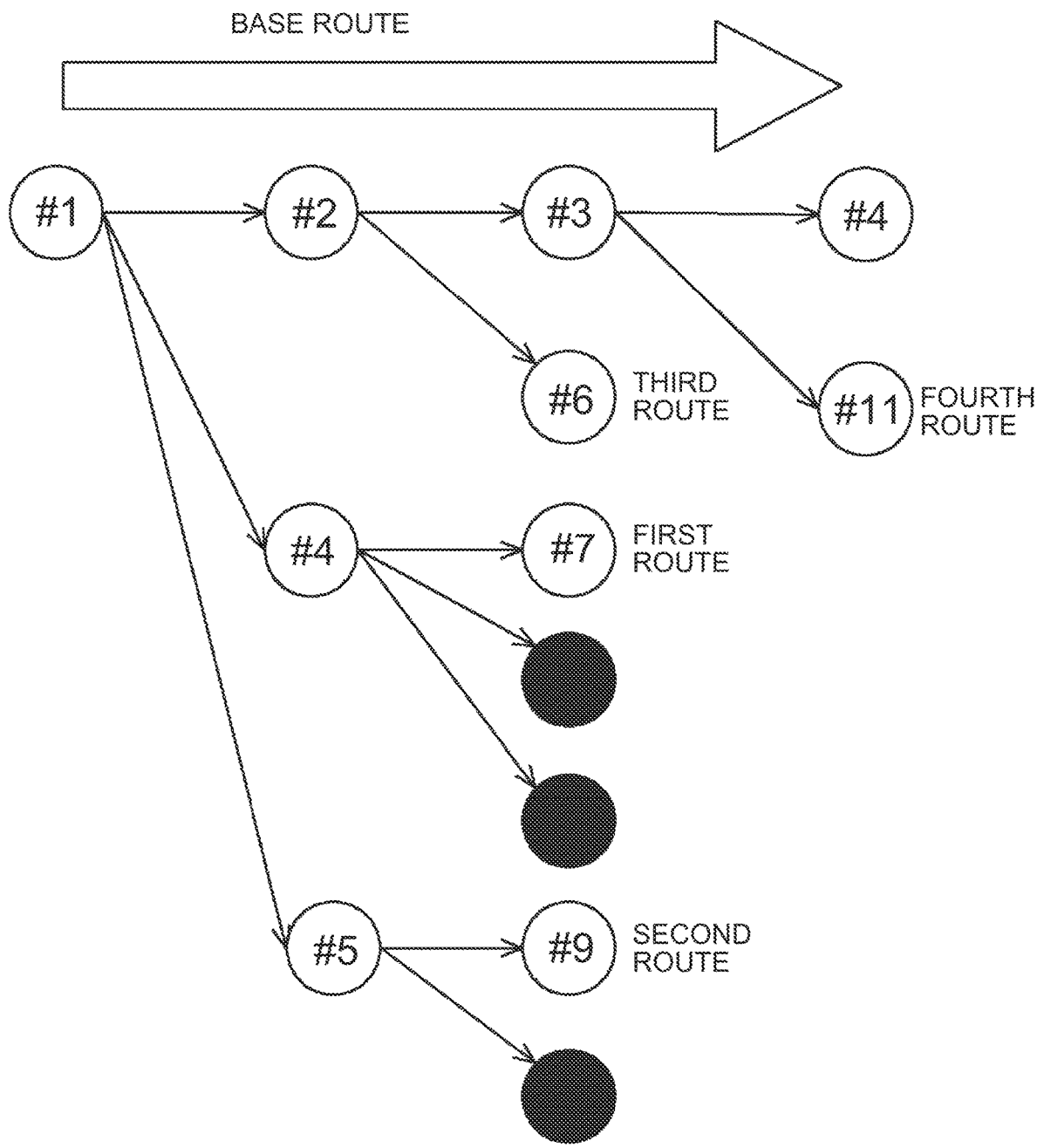
FIG. 9 is a diagram for describing Shallow First.

FIG. 9 is a diagram for describing Shallow First. Each node in FIG. 9 represents a branch point. In Shallow First, a route is created by making branches in order from a first appearing branch point. When a branch point appears after branches are made from a base route, a branch with the highest ranking is selected, and a route is created. Accordingly, in the example shown in FIG. 9, a first route is a branch point #1→a branch point #4→a branch point #7. A second route is the branch point #1→a branch point #5→a branch point #9 because the branch point #5 remains as a branch from the first branch point #1 that appears on the base route.

Note that when a branch point appears after branches are made from the base route, since a branch with the highest ranking is selected, a route is not crated in which a branch other than the branch point #7 with the highest ranking is selected, subsequent to a route in which a transition of the branch point #1→the branch point #4 is made. In FIG. 9, a branch point with which a route is not created is blacked.

In the example shown in FIG. 9, after the first and second routes are obtained, there remains no branch point that branches from the first appearing branch point #1 on the base route, and that does not overlap with the base route or another route. Accordingly, for a third route, a route in which a branch is made from a second appearing branch point #2 on the base route is created. Accordingly, the third route is the branch point #1→the branch point #2→a branch point #6. Similarly, a fourth route is the branch point #1→the branch point #2→a branch point #3→a branch point #11.

Note that although the second prediction unit 13 creates a secondary predicted route based on Shallow First in the first embodiment, a method for creating a secondary predicted route is not limited to Shallow First. For example, the second prediction unit 13 may create a secondary predicted route based on Depth First or Breadth First in which a plurality of routes is created by making branches from a branch point that last appears on a base route.

FIG. 10 shows an example of the processing by the ranking determination unit 14. The ranking determination unit 14 ranks predicted routes. A predicted route that is ranked first is a primary predicted route. For predicted routes ranked second and lower, the ranking determination unit 14 determines rankings in descending order of scores of secondary predicted routes.

In the first embodiment, for a score of a secondary predicted route, the ranking determination unit 14 calculates a mean value of probabilities of transitions between road links on the predicted route. A first secondary predicted route in the example shown in FIG. 10 is a road link #4→a road link #6→a road link #9. The probability of a transition of the road link #4→the road link #6 is 0.3. The probability of a transition of the road link #6→the road link #9 is 0.5. A mean value of the two probabilities of transitions is 0.4. Accordingly, the score of the first secondary predicted route in the example shown in FIG. 10 is 0.4. Similarly, the score of a second secondary predicted route can be calculated at 0.48. A probability of a transition between road links is acquired by referring to the branch information DB 19.

Accordingly, in the example shown in FIG. 10, the second secondary predicted route is ranked second. The first secondary predicted route is ranked third. A result of ranking a predicted route is output, for example, along with the predicted route. Note that a method for calculating a score of a secondary predicted route is not limited to calculating a mean value of probabilities of transitions between road links included in a secondary predicted route. For example, a value obtained by multiplying probabilities of transitions between road links included in a secondary predicted route together may be used for a score of the secondary predicted route.

Processing Flow

Figure 11:
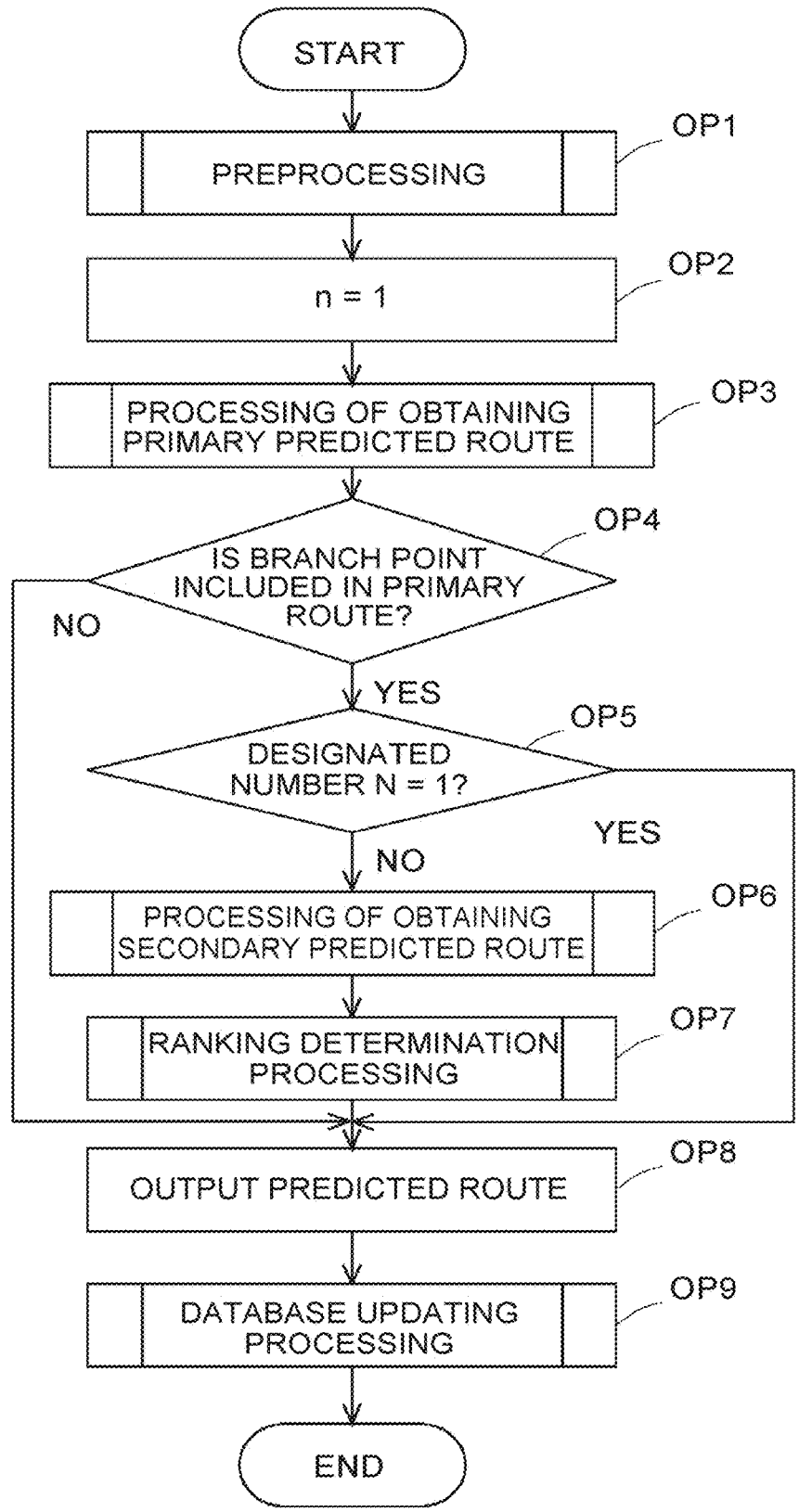
FIG. 11 is an example of a flowchart of the route prediction processing according to the first embodiment.

FIG. 11 is an example of a flowchart of the route prediction processing according to the first embodiment. The processing shown in FIG. 11 is started, for example, when an instruction to start the route prediction processing is input. Along with the instruction to start the route prediction processing, information indicating a movement route followed by a vehicle under route prediction immediately before prediction, a designated number N for predicted routes, and a designated time length T are also input. Although an entity executing the processing shown in FIG. 11 is the CPU 101 of the center server 1, for convenience, a description is given as if functional components are execution entities. The same applies to flowcharts after FIG. 11.

In OP1, the control unit 15 instructs the preprocessing unit 11 to perform the preprocessing, and the preprocessing is performed by the preprocessing unit 11. Details of the processing in OP1 will be described later. In OP2, the control unit 15 sets a variable n to an initial value of one. The variable n is a variable indicating the number of predicted routes obtained.

In OP3, the control unit 15 instructs the first prediction unit 12 to perform the processing of obtaining a primary predicted route, and acquires a primary predicted route from the first prediction unit 12. Details of the processing in OP3 will be described later. In OP4, the control unit 15 determines whether or not a branch point is included in the primary predicted route. The determination in OP4 is performed, for example, by referring to the branch information DB 19. When a branch point is included in the primary predicted route (OP4: YES), the processing advances to OP5. When no branch point is included in the primary predicted route (OP4: NO), such a case indicates that two or more predicted routes cannot be obtained, and the processing advances to OP8. Note that examples of the case where no branch point is included in the primary predicted route include a case where the movement route followed by the vehicle immediately before prediction is on an expressway, and the like.

In OP5, the control unit 15 determines whether or not the designated number N for predicted routes is one. When the designated number N for predicted routes is one (OP5: YES), prediction of secondary routes is not performed, and the processing advance to OP8. When the designated number N for predicted routes is not one, that is, two or more (OP5: NO), the processing advances to OP6.

In OP6, the control unit 15 instructs the second prediction unit 13 to perform the processing of obtaining a secondary predicted route, and acquires one or more secondary predicted routes from the second prediction unit 13. Details of the processing in OP6 will be described later. In OP7, the control unit 15 instructs the ranking determination unit 14 to perform the ranking determination processing, and acquires a result of ranking the one or more secondary predicted routes from the ranking determination unit 14. In OP8, the control unit 15 outputs the predicted route or routes. Examples of a form of outputting the predicted route or routes include display on a display unit, transmission to a predetermined device, output to a file, and the like. The predicted route or routes are output in an output form according to a use case.

In OP9, the control unit 15 performs the database updating processing. In the database updating processing, the branch information DB 19 is updated based on a user rating for each predicted route. Details of the processing in OP9 will be described later. Thereafter, the processing shown in FIG. 11 is terminated.

Figure 12:
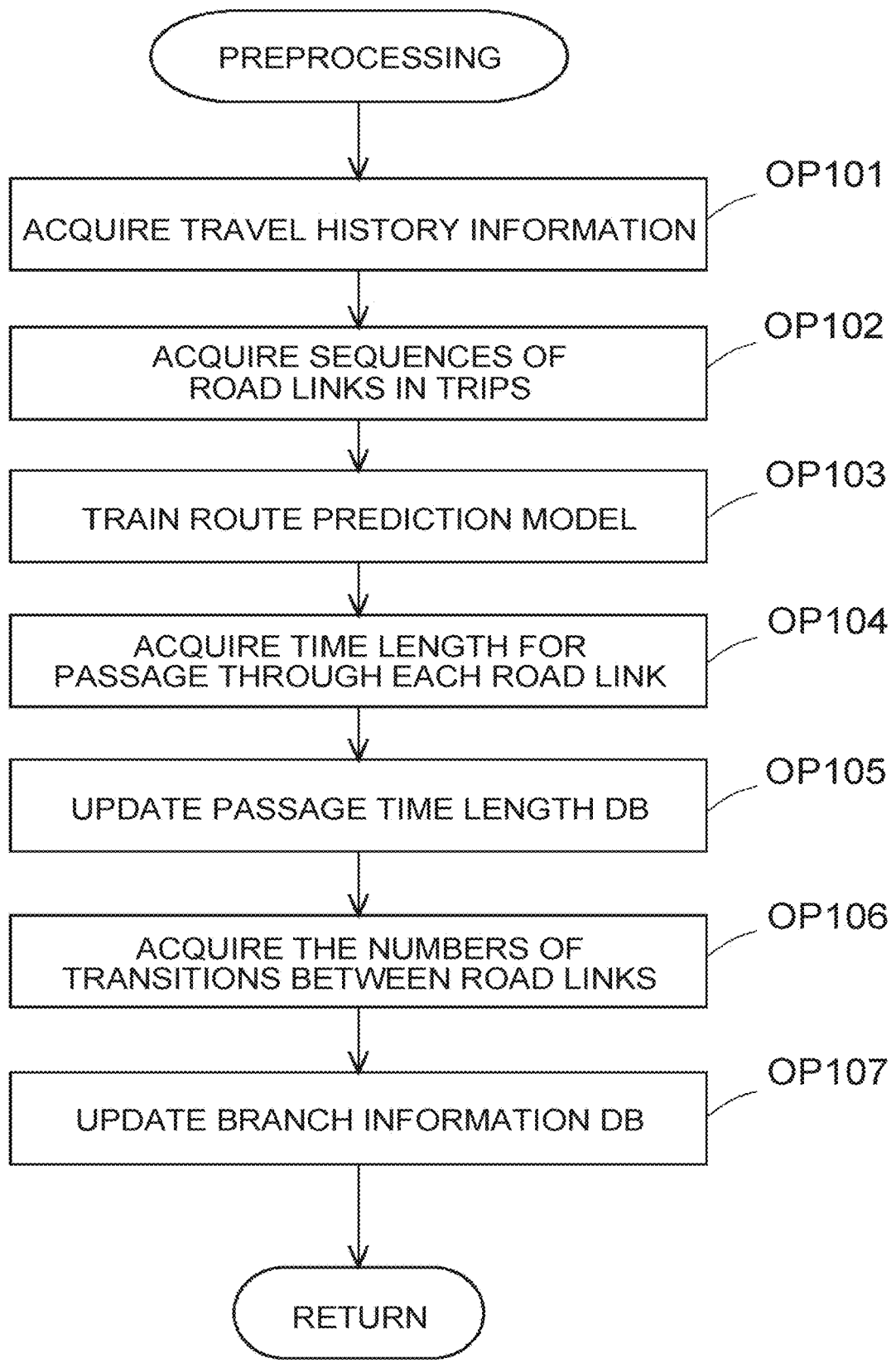
FIG. 12 is an example of a flowchart of preprocessing.

FIG. 12 is an example of a flowchart of the preprocessing. The processing shown in FIG. 12 corresponds to the processing in OP1 in FIG. 11. The processing shown in FIG. 12 is started when the preprocessing unit 11 receives an instruction to perform preprocessing from the control unit 15.

In OP101, the preprocessing unit 11 reads and acquires travel history information for the most recent predetermined time period, from the travel history information DB 16. The read time period may be, for example, a preset time period, or a time period since the previous preprocessing until the present time.

In OP102, the preprocessing unit 11 acquires sequences of road links in a plurality of trips by referring to the road link information DB 17, based on the acquired travel history information (see FIG. 4). In OP103, the preprocessing unit 11 trains the route prediction model by using, for teaching data, the sequences of road links in the plurality of trips acquired in OP102. In OP104, a time length for passage through each road link is acquired based on the sequences of road links in the plurality of trips acquired in OP102. In OP105, the preprocessing unit 11 updates the passage time length DB 18 by using the time length for passage through each road link acquired in OP104.

In OP106, the preprocessing unit 11 acquires the numbers of transitions between road links, based on the sequences of road links in the plurality of trips acquired in OP102. In OP107, the preprocessing unit 11 updates the branch information DB 19 by using the numbers of transitions between road links acquired in OP106. Thereafter, the processing shown in FIG. 12 is finished, and the processing advances to OP2 in FIG. 11. Note that the training of the route prediction model in OP103 may be performed on a stand-alone basis in accordance with an instruction from the control unit 15. The preprocessing shown in FIG. 12 is not only performed as a sub-flow in FIG. 11, but may be performed on a stand-alone basis at a predetermined timing.

Figure 13:
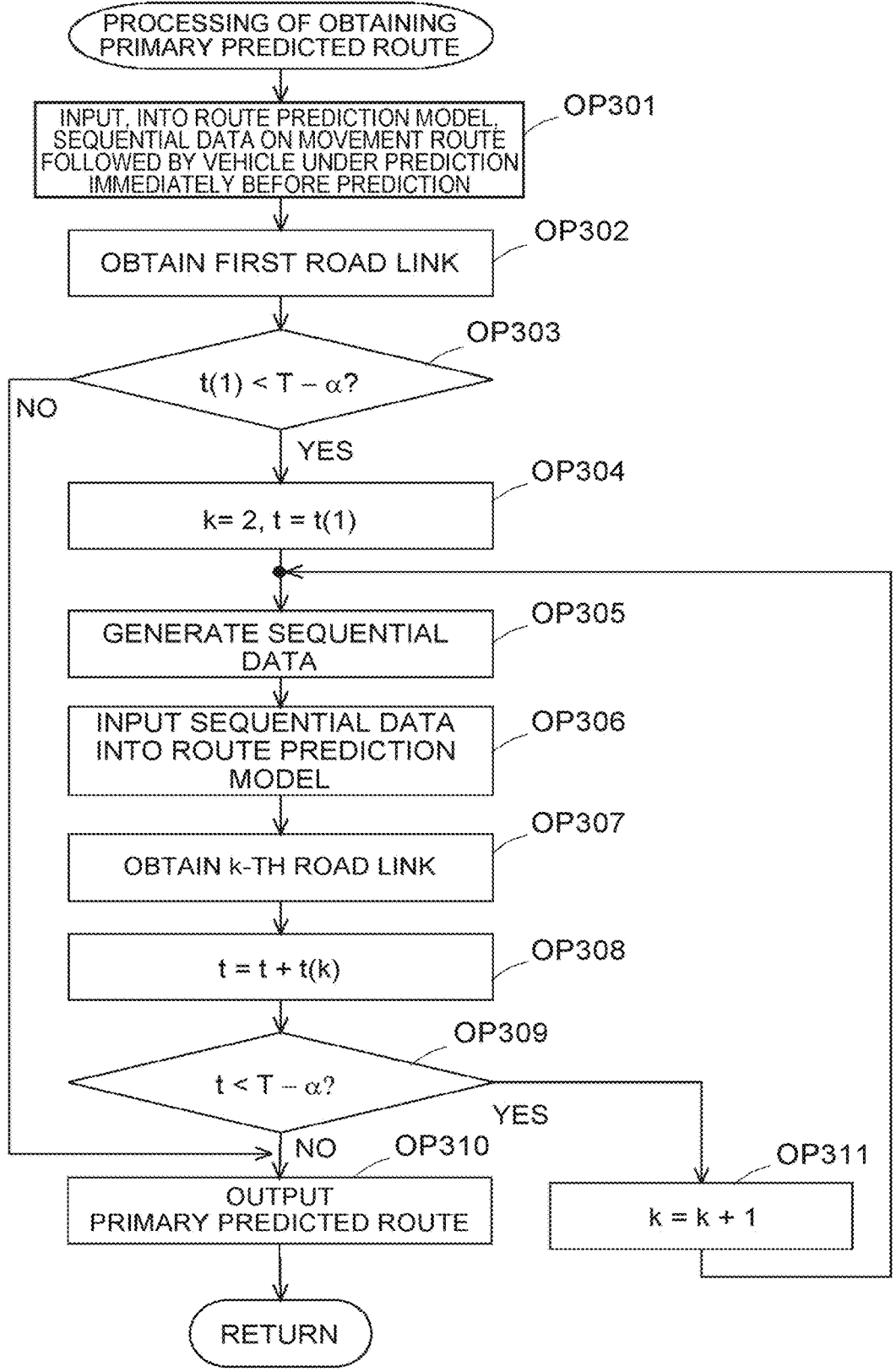
FIG. 13 is an example of a flowchart of the processing of obtaining a primary predicted route.

FIG. 13 is an example of a flowchart of the processing of obtaining a primary predicted route. The processing shown in FIG. 13 corresponds to the processing in OP3 in FIG. 11. The processing shown in FIG. 13 is started when the first prediction unit 12 receives, from the control unit 15, an instruction to perform processing of obtaining a primary predicted route. Along with the instruction to perform processing of obtaining a primary predicted route, the information indicating the movement route followed by the vehicle under route prediction immediately before prediction, and the designated time length T are also input to the first prediction unit 12 from the control unit 15. Note that the flowchart shown in FIG. 13 is described, as an example, based on the premise that the route prediction model described in FIG. 7 is used.

In OP301, the first prediction unit 12 inputs a predetermined size of a sequence of road links (sequential data) into the route prediction model. The sequence of road links is acquired from the movement route followed by the vehicle under route prediction immediately before prediction. In OP302, the first prediction unit 12 obtains a road link output from the route prediction model, as a first road link on a primary predicted route.

In OP303, the first prediction unit 12 determines whether or not an average time length $t(1)$ for passage through the first road link on the primary predicted route obtained in OP302 is less than $T-\alpha$. When $t(1)<T-\alpha$ (OP303: YES), the processing advances to OP304. When t(1)≥T−α (OP303: NO), the processing advances to OP310.

In OP304, the first prediction unit 12 sets a variable k to an initial value of two. Moreover, the first prediction unit 12 sets a variable t to t(1). The variable k is a variable indicating a position of a road link on the primary predicted route. The variable t is a variable indicating a predicted time length for passage through the primary predicted route.

In OP305, the first prediction unit 12 generates sequential data to input into the route prediction model. The sequential data is generated by using the sequential data that is previously input into the route prediction model, and the road link that is the previous output from the route prediction model (see FIG. 7). In OP306, the first prediction unit 12 inputs the sequential data generated in OP305 into the route prediction model. In OP307, the first prediction unit 12 obtains a road link that is output from the route prediction model, as a k-th road link on the primary predicted route. In OP308, the first prediction unit 12 updates the variable t by adding an average time length t(k) for passage through the k-th road link on the primary predicted route to the variable t.

In OP309, the first prediction unit 12 determines whether or not the predicted time length t for passage through the primary predicted route up to the k-th road link is less than T−α. When t<T−α (OP309: YES), the processing advances to OP311. When t≥T−α (OP309: NO), the processing advance to OP310.

In OP310, the first prediction unit 12 determines that the primary predicted route is the first to k-th road links currently obtained, and outputs the determined primary predicted route to the control unit 15. Thereafter, the processing advance to OP4 in FIG. 11. In OP311, the first prediction unit 12 updates the variable k by adding one to the variable k. Thereafter, the processing advances to OP305, and the processing from OP305 for obtaining a k-th road link on the primary predicted route is performed. Note that the processing of obtaining a primary predicted route shown in FIG. 13 is an example, and can be modified as appropriate, for example, by changing the type of the route prediction model, or the like.

Figure 14:
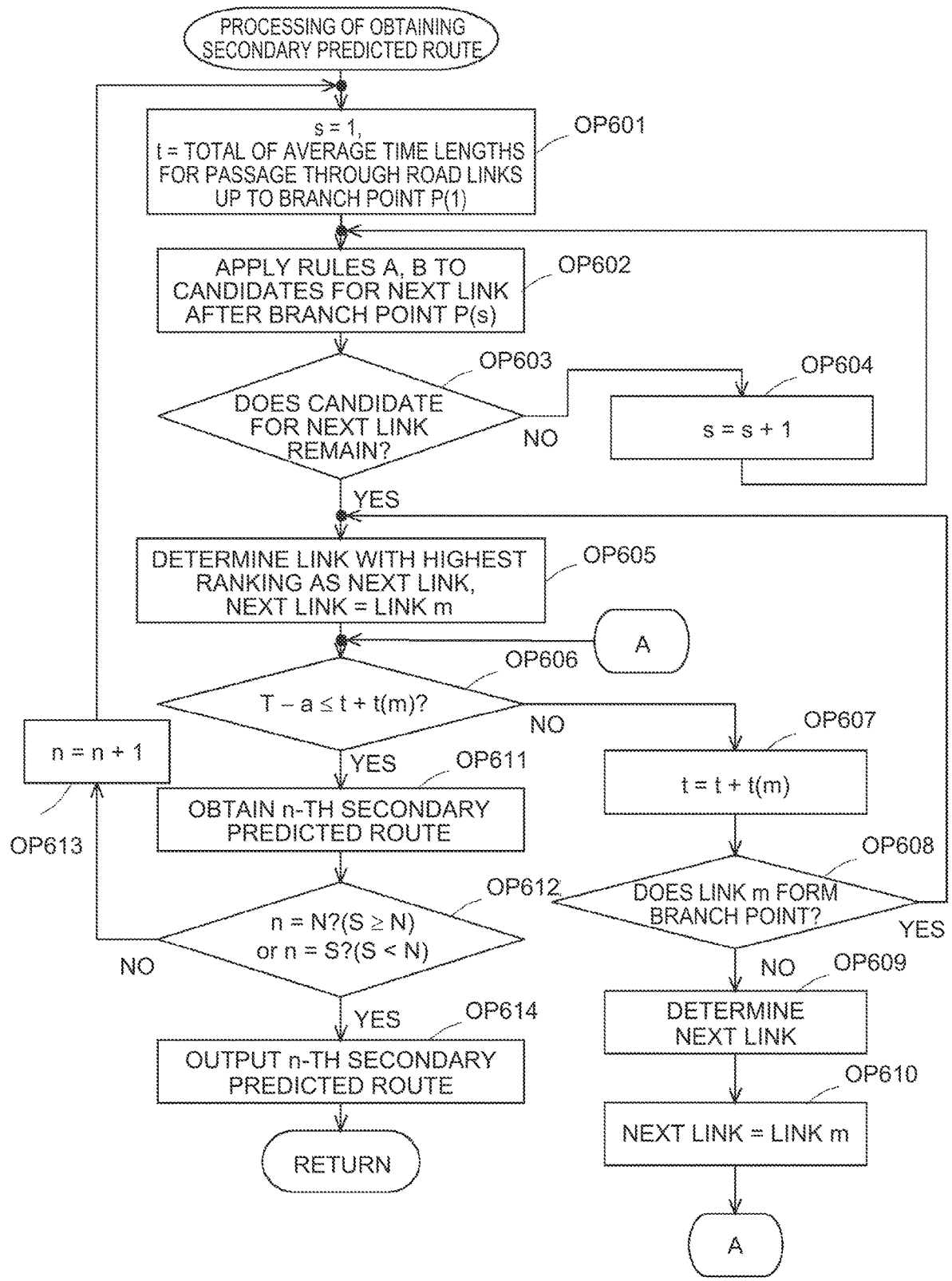
FIG. 14 is an example of a flowchart of the processing of obtaining a secondary predicted route.

FIG. 14 is an example of a flowchart of the processing of obtaining a secondary predicted route. The processing shown in FIG. 14 corresponds to the processing in OP6 in FIG. 11. The processing shown in FIG. 14 is started when the second prediction unit 13 receives, from the control unit 15, an instruction to perform processing of obtaining a secondary predicted route. Along with the instruction to perform processing of obtaining a secondary predicted route, the information indicating the movement route followed by the vehicle under route prediction immediately before prediction, the designated time length T, the designated number N, and the primary predicted route are also input to the second prediction unit 13 from the control unit 15. Note that the flowchart shown in FIG. 14 is described, as an example, based on the premise that Shallow First is used.

In OP601, the second prediction unit 13 sets a variable s to an initial value of one. The variable s indicates a position in order in which a branch point on the primary predicted route appears. The second prediction unit 13 sets the variable t to an initial value that is a total value of one or more respective average time lengths for passage through one or more road links included in the primary predicted route up to a first appearing branch point P(1) on the primary predicted route. The variable t indicates a predicted time length for passage through the predicted route.

In OP602, the second prediction unit 13 applies the rules (A) and (B) described above, to a plurality of road links being candidates for the next link after a road link corresponding to a branch point P(s). The candidates for the next link after the road link corresponding to the branch point P(s) are acquired from the branch information DB 19. The rule (A) is that when a next link is selected at a branch point P on the primary predicted route, a road link that is the next link after the branch point P on the primary predicted route, and a road link that is the next link after the branch point P on the primary predicted route according to another secondary predicted route are excluded. The rule (B) is that at any branch point, when a next link is selected, a road link immediately preceding a road link that corresponds to the branch point is excluded.

In OP603, the second prediction unit 13 determines whether or not a road link that is a candidate for the next link remains after the rules (A) and (B) are applied in the OP602. When a road link that is a candidate for the next link remains (OP603: YES), the processing advances to OP605. When no road link that is a candidate for the next link remains (OP603: NO), the processing advances to OP604. In OP604, the second prediction unit 13 updates the variable s by adding one to the variable s. Thereafter, the processing advances to OP602.

In OP605, the second prediction unit 13 determines a road link with the highest ranking, among remaining road links that are candidates for the next link, as the next link after the branch point P(s). The road link determined as the next link after the branch point P(s) is set as a road link m.

In OP606, the second prediction unit 13 determines whether or not a sum of t and an average time length t(m) for passage through the road link m is equal to or more than T−α. When T−α≤t+t(m) (OP606: YES), the processing advances to OP611. When T−α>t+t(m) (OP606: NO), the processing advances to OP607.

In OP607, the second prediction unit 13 updates the variable t by adding t(m) to the variable t. In OP608, the second prediction unit 13 determines, by referring to the branch information DB 19, whether or not the road link m forms a branch point. When the road link m forms a branch point (OP608: YES), the processing advances to OP605. When the road link m does not form a branch point (OP608: NO), the processing advances to OP609.

In OP609, the second prediction unit 13 determines a road link connecting to the road link m, as the next link after the road link m. In OP610, the second prediction unit 13 makes an update such that the road link determined as the next link after the road link m becomes a new road link m. Thereafter, the processing advances to OP606.

In OP611, since T−α≤t+t(m), the second prediction unit 13 obtains a route including the load links up to the road link m, as an n-th secondary predicted route.

In OP612, when the number S of branch points on the primary predicted route the designated number N, the second prediction unit 13 determines whether or not the variable n is the same value as the designated number N. When S<N, the second prediction unit 13 determines whether or not the variable n is the same value as S. OP612 is processing for determining whether or not a condition for terminating the processing of obtaining a secondary predicted route is satisfied. When a positive determination is made in OP612, the processing advances to OP614. When a negative determination is made in OP612, the processing advances to OP613. In OP613, the second prediction unit 13 updates the variable n by adding one to the variable n. Thereafter, the processing advances to OP601, and the processing for obtaining a new secondary predicted route is performed.

In OP614, the second prediction unit 13 outputs n secondary predicted routes obtained so far to the control unit 15. Thereafter, the processing shown in FIG. 14 is finished, and the processing advances to OP7 in FIG. 11. Note that the processing of obtaining a secondary predicted route shown in FIG. 14 is the processing in a case where Shallow First is adopted for a method for determining a secondary predicted route, and a method for determining a secondary predicted route is not limited the processing shown in FIG. 14. For example, when another method such as Depth First or Breadth First is used, the processing of obtaining a secondary predicted route changes depending on the method used.

Figure 15:
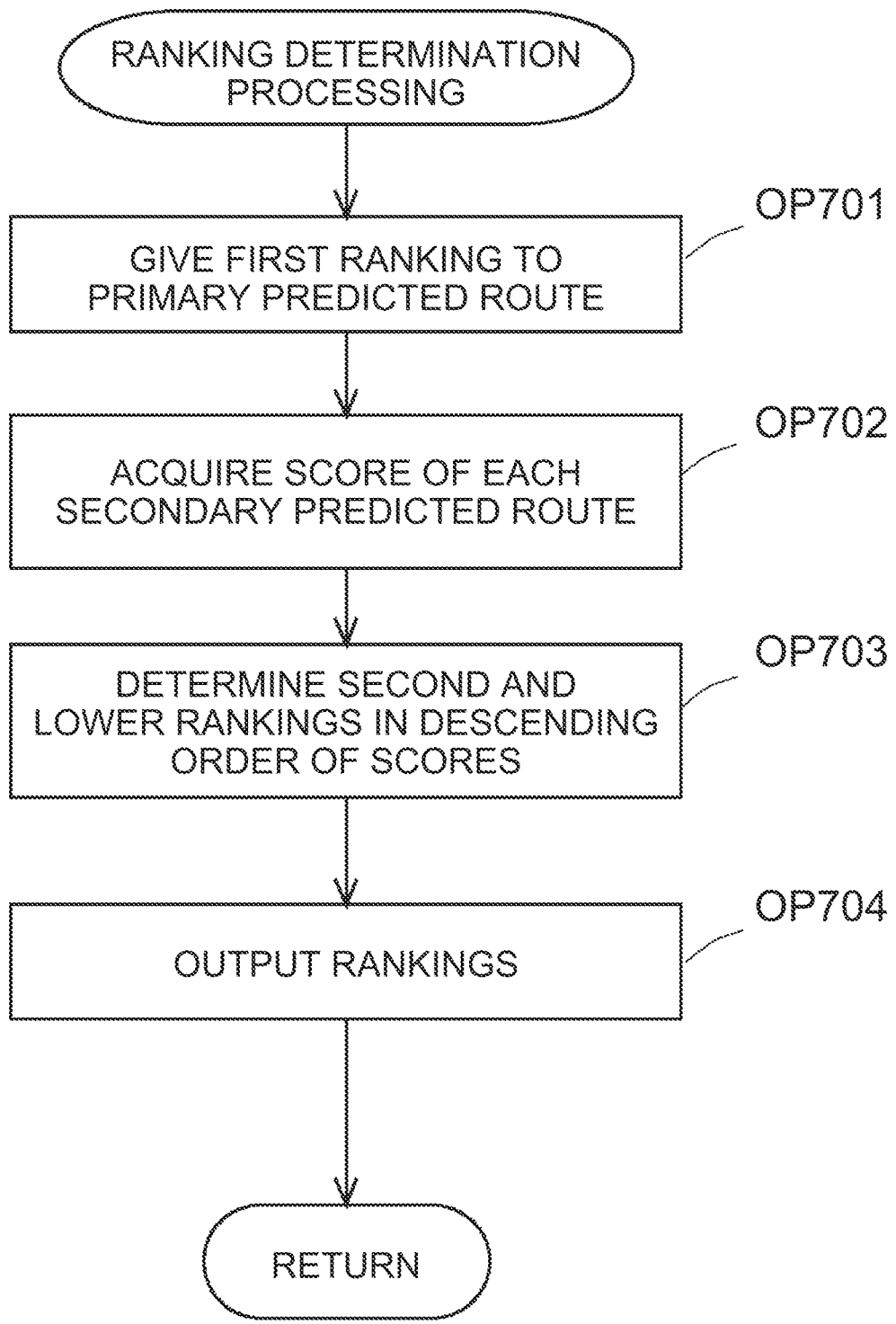
FIG. 15 is an example of a flowchart of ranking determination processing.

FIG. 15 is an example of a flowchart of the ranking determination processing. The processing shown in FIG. 15 corresponds to the processing in OP7 in FIG. 11. The processing shown in FIG. 15 is started when the ranking determination unit 14 receives an instruction to perform ranking determination processing from the control unit 15. Along with the instruction to perform ranking determination processing, the primary predicted route and the one or more secondary predicted routes are also input to the ranking determination unit 14 from the control unit 15.

In OP701, the ranking determination unit 14 gives the first ranking to the primary predicted route. In OP702, the ranking determination unit 14 acquires one or more respective scores of the one or more secondary predicted routes. Each score is acquired, for example, as a mean value of probabilities of transitions between road links.

In OP703, the ranking determination unit 14 determines the second and lower rankings in descending order of the scores of the secondary predicted routes. In OP704, the ranking determination unit 14 outputs the resultant rankings of the predicted routes to the control unit 15. Thereafter, the processing shown in FIG. 15 is finished, and the processing advances to OP8 in FIG. 11.

Figure 16:
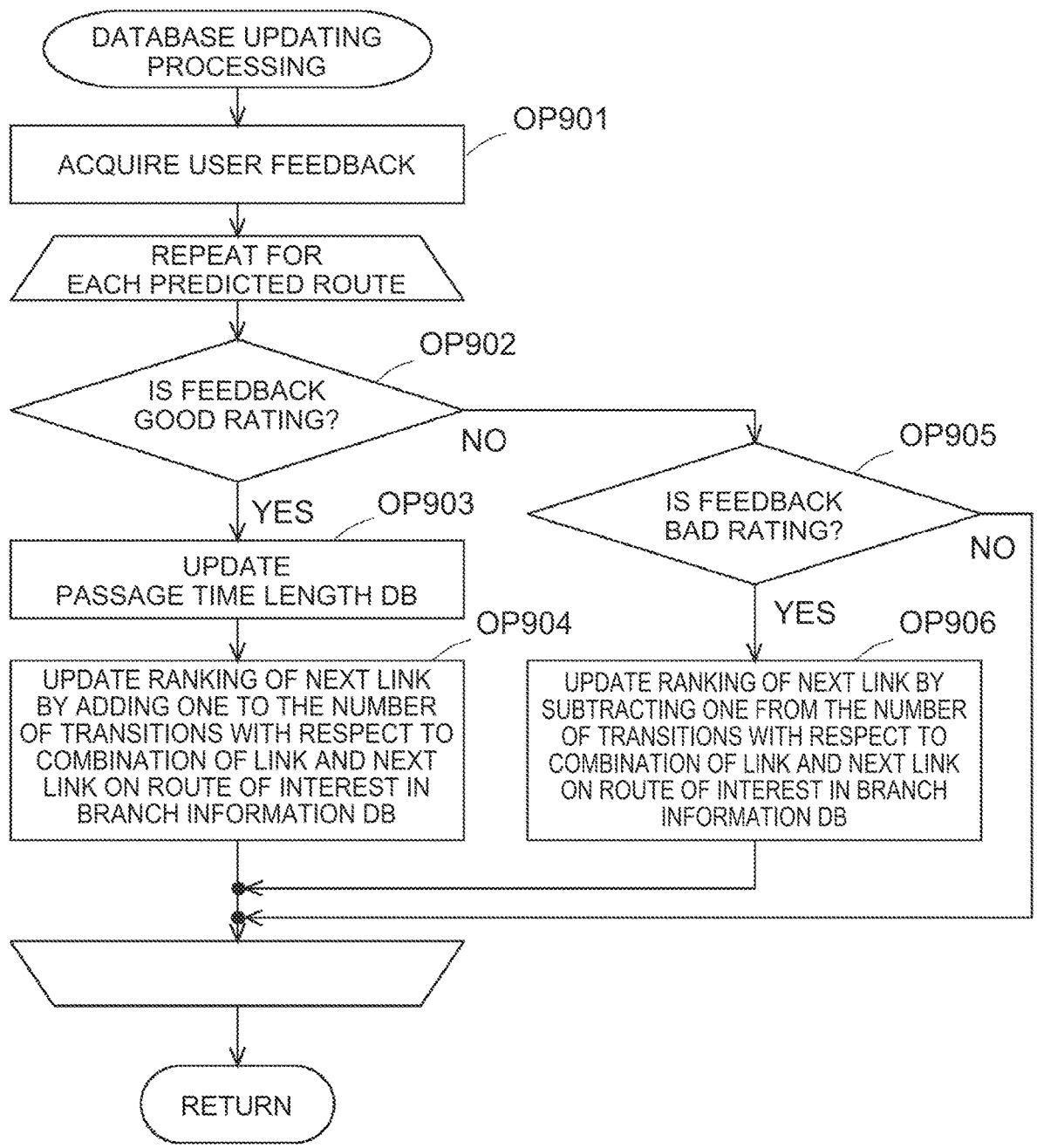
FIG. 16 is an example of a flowchart of database updating processing.

FIG. 16 is an example of a flowchart of the database updating processing. The processing shown in FIG. 16 corresponds to the processing in OP9 in FIG. 11. The processing shown in FIG. 16 is started, for example, when the processing in OP8 in FIG. 11 is finished.

In OP901, the control unit 15 acquires feedback on a predicted route from a user associated with the vehicle under prediction. Examples of the user feedback on a predicted route include feedback that uses "good", "fair", and "poor", and feedback that gives back the predicted route (correct route) that has been actually traveled by the vehicle, and the feedback is not limited to a particular form. The user associated with the vehicle under prediction is, for example, a driver of the vehicle under prediction, an occupant of the vehicle under prediction, or the like. However, a user who rates a predicted route is not limited to the user associated with the vehicle under prediction.

Processing in and after OP902 is repeatedly performed for each predicted route. In OP902, the control unit 15 determines whether or not the feedback on the predicted route of interest indicates a good rating. Examples of the good rating on the predicted route include the fact that a rating of "good" is given, the fact that the vehicle has actually traveled the predicted route, and the like. When the feedback on the predicted route of interest indicates a good rating (OP902: YES), the processing advances to OP903.

In OP903, the control unit 15 measures a time length for passage by the vehicle through each road link included in the predicted route of interest, and updates the passage time length DB 18 by using the time lengths for passage. In OP904, the control unit 15 identifies a transition between road links included in the predicted route of interest, and updates the branch information DB 19 by adding one to the number of transitions with respect to a combination of a corresponding branch point and the next link. When the update causes a change in rankings of road links that are candidates for the next link after the branch point, the control unit 15 updates the rankings of the road links that are candidates for the next link. Arise in the number of transitions increases the probability of a transition with respect to the combination of the branch point and the next link.

When the feedback on the predicted route of interest does not indicate a good rating (OP902: NO), the processing advances to OP905. In OP905, the control unit 15 determines whether or not the feedback on the predicted route of interest indicates a bad rating. Examples of the bad rating on the predicted route include the fact that a rating of "poor" is given, the fact that the vehicle has not traveled the predicted route, and the like. When the feedback on the predicted route of interest indicates a bad rating (OP905: YES), the processing advances to OP906.

In OP906, the control unit 15 identifies a transition between road links included in the predicted route of interest, and updates the branch information DB 19 by subtracting one from the number of transitions with respect to a combination of a corresponding branch point and the next link. When the update causes a change in rankings of road links that are candidates for the next link after the branch point, the control unit 15 updates the rankings of the road links that are candidates for the next link. A fall in the number of transitions decreases the probability of a transition with respect to the combination of the branch point and the next link.

When the feedback on the predicted route of interest indicates neither a good rating nor a bad rating (OP905: NO), the processing advances for a next predicted route, or the processing shown in FIG. 16 is terminated when the processing is finished with respect to all predicted routes. In other words, when the feedback on the predicted route of interest indicates neither a good rating nor a bad rating, the control unit 15 maintains a current state without updating the passage time length DB 18 or the branch information DB 19. An example of a rating on the predicted route of interest that is neither a good rating nor a bad rating is the fact that a rating of "fair" is given. However, the rating that is neither a good rating nor a bad rating is not limited to a rating of "fair".

Note that the database updating processing shown in FIG. 16 is an example, and the database updating processing is not limited to the processing shown in FIG. 16. A method for updating the branch information DB 19 may be changed, for example, depending on the type of information indicating a probability of a transition stored in the branch information DB 19. For example, when the branch information DB 19 includes probabilities of transitions with respect to combinations of a branch point and the next link, a probability of a transition may be increased with respect to a combination applicable to a good rating. In such a case, a probability of a transition may be decreased with respect to a combination applicable to a bad rating.

Use Cases of Predicted Route

FIG. 17 shows an example of outputs of predicted routes in a use case of the route prediction processing according to the first embodiment. In the example shown in FIG. 17, a use case is assumed in which route prediction is performed in real time according to changes in the current position of a traveling vehicle, and predicted routes that change with the changes in the position of the vehicle are proposed to a user. In such a use case, for example, a user operation to start the route prediction processing, made by a driver, is input to an in-vehicle device of a vehicle under prediction, and an instruction to start the route prediction processing is transmitted from the in-vehicle device to the center server 1. For example, predicted routes as a result of the route prediction processing are displayed on a display unit connected to the in-vehicle device.

FIG. 17 shows an example of an output at time T1, and an example of an output at time T1+Δt. In the use case where route prediction is performed in real time according to travel of the vehicle, since a result of the route prediction changes according to the position of the vehicle, a result of the route prediction at time T1 differs from a result of the route prediction at time T1+Δt. At time T1+Δt, since the vehicle is traveling a predicted route that is a candidate #2 at time T1, it can be seen that the predicted route also changes in such a manner as to extend in the same direction as the predicted route that is the candidate #2.

For example, in the use case assumed in the example shown in FIG. 17, the control unit 15 may search a map for a point that can be a destination, around the last road link on each predicted route, and may display the points along with the predicted routes. Thus, for example, when a driver of the vehicle aimlessly takes a drive without fixing a destination, it is possible to provide a wide variety of courses of the vehicle, as well as a shop, a facility, and the like existing around ends of the courses.

FIG. 18 shows an example of an output of predicted routes in another use case of the route prediction processing according to the first embodiment. In the example shown in FIG. 18, a use case is assumed in which the route prediction processing according to the first embodiment is performed according to travel of a hybrid electric vehicle, and it is proposed whether travel is performed by using an engine, or travel is performed by using an electric motor, with respect to each predicted route. For example, the control unit 15 acquires a characteristic of a road link included in each predicted route, by using map information, and determines whether to use an engine or to use an electric motor, to perform travel. For example, in a case of a predicted route including an uphill slope, the control unit 15 may determine travel using an engine, and may display, on an in-vehicle display unit, a recommendation on travel using an engine, along with the predicted route, as shown in FIG. 18. Reversely, in a case of a predicted route including a downhill slope, the control unit 15 may determine travel using an electric motor, and may display, on the in-vehicle display unit, a recommendation on travel using an electric motor, along with the predicted route. Moreover, for a battery electric vehicle, the control unit 15 may determine a schedule of charging and discharging on each predicted route, and may also display scheduled charging or discharging along with the predicted route.

Note that the use cases of the route prediction processing according to the first embodiment are not limited to the examples shown in FIGS. 17 and 18. For example, there is also a use case in which it is proposed what tourist attraction exists in which direction after a predetermined driving route is traveled, along with a plurality of predicted routes obtained through the route prediction processing according to the first embodiment, as well as tourist attractions along the predicted routes.

Operation and Effects of First Embodiment

In the first embodiment, even if destination information on a vehicle under prediction is not set, or even if destination information is not acquired, a route that is next traveled by the vehicle under prediction can be predicted from a movement route immediately previously followed by the vehicle under prediction, by using travel history information on vehicles. The center server 1 according to the first embodiment expresses a route as sequential data of road links, and thereby can predict a route that is next traveled by a vehicle, by using a machine learning model of a type that is commonly used in natural language processing.

When a plurality of predicted routes is obtained by using a machine learning model, the obtained predicted routes, in many cases, are similar routes that are different only at the last branches of the routes, up to which the same road links are passed through in the same order, and the forward directions of the predicted routes concentrate in a particular direction. This is because the machine learning model is configured such that the probability of a route being selected becomes higher. In the first embodiment, a primary predicted route is obtained by using a machine learning model, and a predetermined number of secondary predicted routes are obtained by using the branch information DB 19 in such a manner that the secondary predicted routes are different from the primary predicted route. Thus, the forward directions of the predicted routes can be restrained from concentrating in a particular direction, the forward directions of the predicted routes can be dispersed, and a wide variety of the predicted routes can be made.

The forward directions of the predicted routes can be dispersed by using Shallow First for a method for determining a secondary predicted route.

Other Modifications

The embodiment is only an example, and modifications can be made in implementation of the present disclosure as appropriate within a scope that does not depart from the principle of the present disclosure.

In the first embodiment, route prediction is performed for a vehicle. However, the route prediction processing according to the first embodiment can also be applied to route prediction for a motor cycle, a bicycle, a pedestrian, or the like if it is possible to acquire travel history information or movement history information including position information.

In the first embodiment, the route prediction model is trained by using travel history information on a plurality of vehicles. Moreover, the passage time length DB 18 and the branch information DB 19 are also created from the travel history information on a plurality of vehicles. Accordingly, in the first embodiment, route prediction is performed by using the route prediction model, the passage time length DB 18, and the branch information DB 19 that are generalized. Instead, the route prediction model may be trained and the passage time length DB 18 and the branch information DB 19 may be created by using travel history information on a particular vehicle, whereby the route prediction model, the passage time length DB 18, and the branch information DB 19 can be configured to be ones in which a characteristic of driving of a driver of the vehicle is reflected, and which are specialized for the driver. Thus, a route useful for the particular driver can be predicted. Alternatively, the route prediction model that is generalized by being trained by using travel history information on a plurality of vehicles may be customized for a particular driver by adjusting a parameter of the route prediction model, according to a characteristic of travel of a particular vehicle.

In the first embodiment, the center server 1 performs the route prediction processing for a vehicle. Instead, the route prediction processing may be performed by, for example, an in-vehicle device such a car navigation device, or a user terminal such as a smartphone. For example, when the route prediction model, the passage time length DB 18, and the branch information DB 19 are trained and created such as to be specialized for a particular user as described above, the route prediction processing may be performed by an in-vehicle device of a vehicle driven by the particular user, and a smartphone of the particular user.

In the first embodiment, one primary predicted route is obtained by using the route prediction model. However, a plurality of primary predicted routes may be obtained by using the route prediction model. When a plurality of primary predicted routes is obtained by using the route prediction model, for example, a score of each primary predicted route may be acquired, the primary predicted routes may be ranked based the scores, and a primary predicted route with the first ranking may be used for a base route in the processing of obtaining a secondary predicted route.

The processes and the means described in the present disclosure can be arbitrarily combined for implementation to an extent that no technical contradiction arises.

Moreover, processing described as being performed by a single device may be divided and performed by a plurality of devices. Alternatively, processing described as being performed by different devices may be performed by a single device. In a computer system, it can be flexibly changed which hardware component or components (server component or components) are used to implement each function.

The present disclosure can also be implemented by providing a computer with a computer program in which the functions described in the embodiment are packaged, and by one or more processors included in the computer reading and executing the program. Such a computer program may be provided to the computer by using a non-transitory computer-readable storage medium connectable to a system bus of the computer, or may be provided to the computer via a network. Examples of the non-transitory computer-readable storage medium include any types of disks, such as magnetic disks (Floppy® disk, hard disk drive (HDD), and the like) and optical disks (CD-ROM, DVD disk, Blu-ray Disc, and the like), a read only memory (ROM), a random access memory (RAM), an EPROM, an EEPROM, a magnetic card, a flash memory, an optical card, and any types of media suitable to store electronic instructions.

What is claimed is:

1. An information processing device comprising:
    a storage configured to store first information indicating a relationship between a plurality of road links within a target range, wherein the first information includes, with respect to each of a plurality of second road links branching from a first road link included in the plurality of road links within the target range, information indicating a first probability of a transition from the first road link to a second road link of the plurality of second road links; and
    processing circuitry configured to:
        perform prediction, from a first movement route including a predetermined number of continuous road links, of one or more road links that are traveled by a first mobile object subsequent to the first movement route, based on movement history information on one or more mobile objects traveling on a road;
        perform the prediction by using a machine learning model that, for an input of sequential data, outputs one piece of data or sequential data subsequent to the input sequential data, the machine learning model trained such as to, for an input of sequential data including the predetermined number of the continuous road links, output one or more road links that are traveled by a mobile object subsequent to the predetermined number of the continuous road links;
        obtain, by using the machine learning model, a primary predicted route including a plurality of road links, the primary predicted route to be traveled by the first mobile object subsequent to the first movement route;
        obtain, based on the first information and the primary predicted route, a predetermined number of secondary predicted routes each including a plurality of road links, the secondary predicted routes to be traveled by the first mobile object subsequent to the first movement route;
        output the primary predicted route and the predetermined number of the secondary predicted routes;
        acquire a score of each of the predetermined number of the secondary predicted routes, based on the first probability between each pair of road links at a branch point; and
        rank the predetermined number of the secondary predicted routes, based on the respective scores of the predetermined number of the secondary predicted routes.

2. The information processing device according to claim 1, wherein the processing circuitry is further configured to:
    acquire information indicating a rating of each of the primary predicted route and the predetermined number of the secondary predicted routes; and
    update the first information, based on the information indicating the ratings.

3. An information processing method implemented by a computer, the method comprising:
    storing first information indicating a relationship between a plurality of road links within a target range, wherein first information includes, with respect to each of a plurality of second road links branching from a first road link included in the plurality of road links within the target range, information indicating a first probability of a transition from first road link to a second road link of the plurality of second road links;
    performing prediction, from a first movement route including a predetermined number of continuous road links, of one or more road links that are traveled by a first mobile object subsequent to the first movement route, based on movement history information on one or more mobile objects traveling on a road;
    outputting the one or more road links as a result of the prediction;
    performing the prediction by using a machine learning model that, for an input of sequential data, outputs one piece of data or sequential data subsequent to the input sequential data, the machine learning model trained such as to, for an input of sequential data including the predetermined number of the continuous road links, output one or more road links that are traveled by a mobile object subsequent to the predetermined number of the continuous road links,
    obtaining, by using the machine learning model, a primary predicted route including a plurality of road links, the primary predicted route to be traveled by the first mobile object subsequent to the first movement route;
    obtaining, based on the primary predicted route and the first information indicating a relationship between the plurality of road links within the target range, a predetermined number of secondary predicted routes each including a plurality of road links, the secondary predicted routes to be traveled by the first mobile object subsequent to the first movement route;

outputting the primary predicted route and the predetermined number of the secondary predicted routes;

acquiring a score of each of the predetermined number of the secondary predicted routes, based on the first probability between each pair of road links at a branch point; and ranking the predetermined number of the secondary predicted routes, based on the respective scores of the predetermined number of the secondary predicted routes.

4. The information processing method according to claim 3, further comprising:

acquiring information indicating a rating of each of the primary predicted route and the predetermined number of the secondary predicted routes; and updating the first information, based on the information indicating the ratings.

* * * * *